US008239295B2

(12) United States Patent
Hsu et al.

(10) Patent No.: US 8,239,295 B2
(45) Date of Patent: *Aug. 7, 2012

(54) E-COUPONING

(76) Inventors: Michael Shing-Chung Hsu, McLean, VA (US); Michael Murray, Leesburg, VA (US)

( * ) Notice: Subject to any disclaimer, the term of this patent is extended or adjusted under 35 U.S.C. 154(b) by 184 days.

This patent is subject to a terminal disclaimer.

(21) Appl. No.: 12/848,275

(22) Filed: Aug. 2, 2010

(65) Prior Publication Data

US 2011/0029368 A1    Feb. 3, 2011

Related U.S. Application Data

(63) Continuation of application No. 11/750,064, filed on May 17, 2007, now Pat. No. 7,783,532.

(60) Provisional application No. 60/862,036, filed on Oct. 18, 2006, provisional application No. 60/895,020, filed on Mar. 15, 2007.

(51) Int. Cl.
    *G06F 176/60* (2006.01)
(52) U.S. Cl. ............... 705/28; 705/14.11; 705/14.16; 705/14.22; 705/14.34; 705/14.36
(58) Field of Classification Search ........... 705/14.11, 705/14.16, 14.22, 14.28, 14.34, 14.36
    See application file for complete search history.

(56) References Cited

U.S. PATENT DOCUMENTS

| | | | |
|---|---|---|---|
| 4,674,041 A | 6/1987 | Lemon et al. | |
| 4,882,675 A | 11/1989 | Nichtberger et al. | |
| 4,949,256 A | 8/1990 | Humble | |
| 5,256,863 A | 10/1993 | Ferguson et al. | |
| 5,471,669 A | 11/1995 | Lidman | |
| 5,727,153 A | 3/1998 | Powell | |
| 5,806,044 A | 9/1998 | Powell | |
| 5,855,007 A | 12/1998 | Jovicic et al. | |
| 5,884,278 A | 3/1999 | Powell | |
| 5,887,271 A | 3/1999 | Powell | |
| 5,890,135 A | 3/1999 | Powell | |
| 5,956,694 A | 9/1999 | Powell | |
| 5,970,469 A | 10/1999 | Scroggie et al. | |
| 6,009,411 A | 12/1999 | Kepecs | |
| 6,012,038 A | 1/2000 | Powell | |
| 6,014,634 A | 1/2000 | Scroggie et al. | |
| 6,041,309 A | 3/2000 | Laor | |
| 6,055,509 A | 4/2000 | Powell | |
| 6,067,526 A | 5/2000 | Powell | |
| 6,076,069 A | 6/2000 | Laor | |
| 6,105,002 A | 8/2000 | Powell | |
| 6,112,988 A | 9/2000 | Powell | |
| 6,173,891 B1 | 1/2001 | Powell | |

(Continued)

*Primary Examiner* — Namrata Boveja
*Assistant Examiner* — Michael Goldman
(74) *Attorney, Agent, or Firm* — Finnegan, Henderson, Farabow, Garrett & Dunner, LLP

(57) ABSTRACT

Handling electronic coupons includes accessing information indicating association of an electronic coupon with an account of a user that identifies multiple retail entities associated with the user. Information indicating association of electronic coupons with the user's account may be transmitted to respective computer systems associated with the multiple retail entities. The computer systems may associate electronic coupons with the user such that the user may redeem the electronic coupons at a retail store upon presentation of a user identifier. When the user redeems an electronic coupon, cancellation information for the electronic coupon may be transmitted to the computer systems of other retail entities associated with the user. Receipt of the cancellation information may cause the respective computer systems to cancel the redeemability of the electronic coupon such that the user is prevented from redeeming the electronic coupon at a retail store associated with the corresponding retail entity.

20 Claims, 27 Drawing Sheets

U.S. PATENT DOCUMENTS

| | | |
|---|---|---|
| 6,185,541 B1 | 2/2001 | Scroggie et al. |
| 6,237,145 B1 | 5/2001 | Narasimhan et al. |
| 6,243,687 B1 | 6/2001 | Powell |
| 6,317,650 B1 | 11/2001 | Powell et al. |
| 6,321,208 B1 | 11/2001 | Barnett et al. |
| 6,330,543 B1 | 12/2001 | Kepecs |
| 6,332,128 B1 | 12/2001 | Nicholson |
| 6,336,098 B1 | 1/2002 | Fortenberry et al. |
| 6,336,099 B1 | 1/2002 | Barnett et al. |
| 6,339,762 B1 | 1/2002 | Powell |
| 6,354,495 B1 | 3/2002 | Powell |
| 6,456,980 B1 | 9/2002 | Powell |
| 6,505,773 B1 | 1/2003 | Palmer et al. |
| 6,571,216 B1 | 5/2003 | Garg et al. |
| 6,584,448 B1 | 6/2003 | Laor |
| 6,885,994 B1 | 4/2005 | Scroggie et al. |
| 6,915,271 B1 | 7/2005 | Meyer et al. |
| 6,937,995 B1 | 8/2005 | Kepecs |
| 7,013,286 B1 | 3/2006 | Aggarwal et al. |
| 7,016,860 B2 | 3/2006 | Modani et al. |
| 2001/0039512 A1 | 11/2001 | Nicholson |
| 2001/0049627 A1 | 12/2001 | Simpson |
| 2002/0010627 A1 | 1/2002 | Lerat |
| 2002/0040321 A1 | 4/2002 | Nicholson |
| 2002/0049631 A1 | 4/2002 | Williams |
| 2002/0107738 A1* | 8/2002 | Beach et al. .................. 705/14 |
| 2002/0120495 A1 | 8/2002 | Powell et al. |
| 2002/0173972 A1 | 11/2002 | Daniel et al. |
| 2002/0188502 A1 | 12/2002 | Powell |
| 2003/0028426 A1 | 2/2003 | Banerjee et al. |
| 2003/0028518 A1 | 2/2003 | Mankoff |
| 2003/0050831 A1 | 3/2003 | Klayh |
| 2003/0136830 A1 | 7/2003 | Powell et al. |
| 2004/0024638 A1 | 2/2004 | Restis |
| 2004/0030598 A1 | 2/2004 | Boal |
| 2004/0054575 A1 | 3/2004 | Marshall |
| 2004/0064365 A1 | 4/2004 | Sjoblom et al. |
| 2004/0064370 A1 | 4/2004 | Powell |
| 2004/0073487 A1 | 4/2004 | Powell et al. |
| 2004/0107135 A1 | 6/2004 | Deatherage et al. |
| 2004/0133474 A1 | 7/2004 | Tami et al. |
| 2004/0158493 A1 | 8/2004 | Nicholson |
| 2004/0193487 A1 | 9/2004 | Purcell et al. |
| 2005/0015300 A1 | 1/2005 | Smith et al. |
| 2005/0102181 A1 | 5/2005 | Scroggie et al. |
| 2005/0114213 A1 | 5/2005 | Smith et al. |
| 2005/0119938 A1 | 6/2005 | Smith et al. |
| 2005/0160000 A1 | 7/2005 | Plourde |
| 2005/0234771 A1* | 10/2005 | Register et al. .................. 705/14 |
| 2006/0074784 A1 | 4/2006 | Brown |
| 2006/0095324 A1 | 5/2006 | Vergeyle et al. |
| 2006/0149627 A1 | 7/2006 | Brown |
| 2006/0229946 A1 | 10/2006 | Scroggie et al. |

* cited by examiner

FIG. 7

AOL Parkview Coupon Manager (Branding area)

Welcome, kcastilon24
CPG – General Mills

Previous | Next View All | Awaiting Approval

| | Brand | Product | Savings | Status |
|---|---|---|---|---|
| ☐ | Reynolds | Whole Grain Total | Save 50¢ | Awaiting Approval |
| ☐ | 8th Continent | Soymilk | Save 50¢ | Awaiting Approval |

View Coupon (Editable version)

| | |
|---|---|
| Bar Code | 51600073050 |
| Savings | Save 50¢ |
| Brand & Product | Brand: Reynolds Product: Whole Grain Total |
| Categories (1) | 1a: Breakfast 1b: Cereal |
| Categories (2) | 2a: 2b: |
| Maximum Coupons Allowed | 999 |
| Receipt Text | Save on Total |
| Detail Text | Save 50 cents on any Total Cereal |
| Search Text | Total, Whole Grain |
| Redeemable Start | 06/21/2006 |
| Expiration | 11/29/2006 |
| Thumbnail Image | ☒ No Thumbnail Image uploaded Dimensions: 68px (h) x 50px (w) |
| Full Size Image | ☒ No Thumbnail Image uploaded |

New

FIG. 8

AOL Parkview Coupon Manager (Branding area)      Welcome, kcastilon24
CPG— General Mills ▼

Previous | Next View All | Awaiting Approval ▼ |

| ☐ | Brand | Product | Savings | Status |
|---|---|---|---|---|
| ☐ | Reynolds | Whole Grain Total | Save 50¢ | Awaiting Approval |
| ☐ | 8th Continent | Soymilk | Save 50¢ | Awaiting Approval |

Create Coupon

Status *: Approved ▼ — 910
        Approved
        Rejected

Bar Code *: 51600073050    Save 50¢

Brand & Product *: Brand:* Reynolds ▼   Product:* Whole Grain Total

Categories (1): 1a: Breakfast ▼   1b: Cereal ▼

Categories (2): 2a: --Select One-- ▼   2b: ▼

Maximum Coupons Allowed *: 999

Receipt Text *: Save on Total

Detail Text: Save 50 cents on any Total cereal

Search Text: Total Whole Grain   [<] [>]

[New] [Delete]      [Save Changes] [Cancel]

E-COUPONING

CROSS REFERENCE TO RELATED APPLICATIONS

The present application is a continuation application of U.S. patent application Ser. No. 11/750,064, filed May 17, 2007 now U.S. Pat. No. 7,783,532 (allowed), which claims priority to U.S. Provisional Application No. 60/862,036, filed Oct. 18, 2006, and U.S. Provisional Application No. 60/895,020, filed Mar. 15, 2007, each of which is incorporated herein by reference in its entirety.

TECHNICAL FIELD

This disclosure relates to electronic coupons.

BACKGROUND

Product manufacturers and retailers have long offered coupons as incentives for purchasing particular products. Typically, coupons offer consumers a discount or other reward for purchasing a particular product and have been distributed by manufacturers and retailers in a paper format. A consumer may redeem a paper coupon by taking the paper coupon to a retailer a purchasing products that satisfy the terms of the paper coupon. Techniques have been developed to enable exchange and/or redemption of coupons electronically.

SUMMARY

In one aspect, information indicating association of an electronic coupon with an account of a user of an electronic coupon system is accessed. The account includes information identifying a first retail entity associated with the user and a second retail entity associated with the user, with the second retail entity being different than the first retail entity. Information indicating association of the electronic coupon with the user's account is transmitted to a first computer system associated With the first retail entity. Receipt of the information indicating association of the electronic coupon by the first computer system causes the first computer system to associate the electronic coupon with the user such that the user may redeem the electronic coupon at a retail store associated with the first retail entity upon presentation of a first user identifier. Information indicating association of the electronic coupon with the user's account is transmitted to a second computer system associated with the second retail entity. The second computer system is different from the first computer system and receipt of the information indicating association of the electronic coupon by the second computer system causes the second computer system to associate the electronic coupon with the user such that the user may redeem the electronic coupon at a retail store associated with the second retail entity upon presentation of a second user identifier. Information indicating that the user has redeemed the electronic coupon at a retail store associated with the first retail entity is received from the first computer system. In response to receiving, from the first computer system, the information indicating that the user has redeemed the electronic coupon at the retail store associated with the first retail entity, cancellation information for the electronic coupon is transmitted to the second computer system associated with the second retail entity. Receipt of the cancellation information by the second computer system causes the second computer system to cancel the redeemability of the electronic coupon by the user such that the user is prevented from redeeming the electronic coupon at a retail store associated with the second retail entity.

Implementations may include one or more of the following features. For example, an identifier of the electronic coupon and information related to terms of the electronic coupon may be transmitted to the first computer system associated with the first retail entity and the second computer system associated with the second retail entity prior to information indicating association of the electronic coupon with the user's account being accessed. In this example, an identifier of the user and the identifier of the electronic coupon may be transmitted to the first computer system such that information related to the terms of the electronic coupon at the first computer system may be associated with the user and an identifier of the user and the identifier of the electronic coupon may be transmitted to the second computer system such that information related to the terms Of the electronic coupon at the second computer system may be associated with the user.

In some implementations, information identifying a third retail entity to associate with the user's account may be received after the information indicating association of the electronic coupon with the user's account is accessed and prior to information indicating that the user has redeemed the electronic coupon at the retail store associated with the first retail entity being received from the first computer system. The third retail entity may be different than the first retail entity and the second retail entity. In such implementations, the third retail entity may he associated with the user's account in response to receiving the information identifying the third retail entity, and information indicating that the electronic coupon is associated with the user's account may be transmitted to a third computer system associated with the third retail entity. The third computer system may be different from the first computer system and the second computer system and receipt of the information indicating that the electronic coupon is associated with the user's account by the third computer system may cause the third computer system to associate the electronic coupon with the user such that the user may redeem the electronic coupon at a retail store associated with the third retail entity upon presentation of a third user identifier. In some implementations, in response to receiving, from the first computer system, the information indicating that the user has redeemed the electronic coupon at the retail store associated with the first retail entity, cancellation information for the electronic coupon may be transmitted to the third computer system associated with the third retail entity. Receipt of the cancellation information by the third computer system may cause the third computer system to cancel the redeemability of the electronic coupon by the user such that the user may be prevented from redeeming the electronic coupon at a retail store associated with the third retail entity.

In some implementations, an identifier of the electronic coupon and information related to terms of the electronic coupon may be transmitted to the third computer system associated with the third retail entity prior to the information indicating that the electronic coupon is associated with the user's account being transmitted to the third computer system. In such implementations, an identifier of the user and the identifier of the electronic coupon may be transmitted to the third computer system such the information related to the terms of the electronic coupon at the third computer system may be associated with the user.

Information indicating association of a second electronic coupon with the user's account may be accessed. The second electronic coupon may be different than the first electronic coupon and offered by the first retail entity. The second electronic coupon may be determined to be specific to the first retail entity, and information indicating association of the second electronic coupon with the user's account may be transmitted to the first computer system associated with the first retail entity but not to the second computer system associated with the second retail entity. Receipt of the information indicating association of the second electronic coupon by the first computer system may cause the first computer system to associate the second electronic coupon with the user such that the user may redeem the second electronic coupon at a retail store associated with the first retail entity upon presentation of the first user identifier.

The first user identifier and the second user identifier each may include at least one of a loyalty card number, a user account number, a credit card number, a name, a biometric identifier, or a wireless identification number provided by a device configured to transmit the wireless identification number.

In some implementations, information indicating association of the electronic coupon with the user's account may be transmitted to a first loyalty server included in the first computer system. The first loyalty server may be configured to store information associating the electronic coupon with the user such that the user may redeem the electronic coupon at a retail store associated with the first loyalty server by presenting a first loyalty card to a first point-of-sale computer included in the first computer system. Information indicating association of the electronic coupon with the user's account may be transmitted to a second loyalty server included in the second computer system. The second loyalty server may be configured to store information associating the electronic coupon with the user such that the user may redeem the electronic coupon at a retail store associated with the second loyalty server by presenting a second loyalty card to a second point-of-sale computer included in the second computer system. Information indicating that the user has redeemed the electronic coupon at a retail store associated with the first loyalty server may be received from the first loyalty server. The first loyalty server may be configured to transmit the information indicating that the user has redeemed the electronic coupon in response to receiving information, from the first point-of-sale computer, indicating that the user has redeemed the electronic coupon.

In some implementations, an account of the user of the electronic coupon system may be maintained, a selection of an electronic coupon by the user may be received, and the electronic coupon may be associated with the user's account. The electronic coupon may be presented over a network to a user computer system such that a display of the user computer system is able to display the electronic coupon in a user interface. A selection of the electronic coupon made by the user interacting with the user interface displaying the electronic coupon may be received over the network.

In some implementations, information indicating redemption of the electronic coupon by the user may be transmitted to the second computer system associated with the second retail entity. Information indicating association of the electronic coupon with the account of the user of the electronic coupon system may be received.

In another aspect, an electronic coupon system includes an application server, a messaging hub, a first computer system associated with a first retail entity, and a second computer system associated with a second retail entity. The second computer system is different from the first computer system and the second retail entity is different than the first retail entity. The application server is configured to maintain an account for a user of the electronic coupon system, and associate an electronic coupon with the user's account. The user's account includes information associating the first retail entity and the second retail entity with the user. The messaging hub is configured to access information indicating association of the electronic coupon with the user's account, transmit information indicating association of the electronic coupon with the user's account to the first computer system associated With the first retail entity, and transmit information indicating association of the electronic coupon with the user's account to the second computer system associated with the second retail entity. The first computer system is configured to receive the information indicating association Of the electronic coupon with the user's account and, upon receipt, associate the electronic coupon with the user such that the user may redeem the electronic coupon at a retail store associated with the first retail entity upon presentation of a first user identifier. The second computer is configured to receive the information indicating association of the electronic coupon with the user's account and, upon receipt, associate the electronic coupon with the user such that the user may redeem the electronic coupon at a retail store associated with the second retail entity upon presentation of a second user identifier. The first computer system, is further configured to transmit information to the messaging hub indicating that the user has redeemed the electronic coupon at a retail store associated with the first retail entity. The messaging hub is further configured to receive the information indicating that the user has redeemed the electronic coupon at the retail store associated with the first retail entity, and, in response to receiving, from the first computer system, the information indicating that the user has redeemed the electronic coupon at the retail store associated with the first retail entity, transmit cancellation information for the electronic coupon to the second computer system associated with the second retail entity. The second computer system is further configured to receive the cancellation information for the electronic coupon and, upon receipt, cancel the redeemability of the electronic coupon by the user to prevent the user from redeeming the electronic coupon at a retail store associated with the second retail entity.

Implementations of the described techniques may include hardware, a method or process, or computer software on a computer-accessible medium. The details of one or more implementations are set forth in the accompanying drawings and the description below. Other features will be apparent from the description and drawings.

DESCRIPTION OF DRAWINGS

FIGS. 5-7 illustrate examples of user interfaces that an application system may use in performing a process for adding or editing coupons made available to a user of an electronic coupon system.

FIGS. 8-10 illustrate examples of user interfaces that an application system may use in performing a process for approving coupons added to an application system.

FIGS. 12-20 illustrate examples of user interfaces that an electronic coupon management system may use in performing a process involving a customer interacting with an electronic coupon management system.

Like reference symbols in the various drawings indicate like elements.

DETAILED DESCRIPTION

In one implementation, an electronic coupon system provides and manages electronic coupons. The electronic coupon system includes an application system and one or more retailer systems. The application system receives a selection from a user indicating coupons he or she wishes to associate with one or more retailer loyalty cards. Upon receiving the selection, the application system stores the coupon information associated with the user and exchanges the coupon information with one or more retailer systems that correspond to the one or more retailer loyalty cards. When the user purchases goods at a retailer and presents his or her loyalty card, the retailer system identifies coupons associated with the loyalty card and automatically redeems coupons for which the customer is purchasing corresponding goods. When coupons are redeemed, the retailer system exchanges information indicating the redemption with the application system and the other retailer systems to facilitate coupon management. The other retailer systems then may remove the association between the redeemed coupon and corresponding loyalty cards.

Thus, a user may access the application system and use it to associate a coupon with one or more loyalty cards for different retailers. In other words, the user may have a loyalty card for a first retailer and a second loyalty card for a second, different retailer, and may associate the coupon with both loyalty cards. When the user uses one of the loyalty cards to redeem the coupon, the association is removed from both cards. For example, a user may associate a coupon with his or her loyalty card for Kroger grocery stores and his or her loyalty card for Safeway grocery stores. The user can then redeem the coupon at either Kroger or Safeway by presenting the corresponding loyalty card. But the user may be allowed to only redeem the coupon at one of the grocery stores. In this case, once the coupon has been redeemed at one of the retailers, it may be removed from both cards.

Figure 1A:
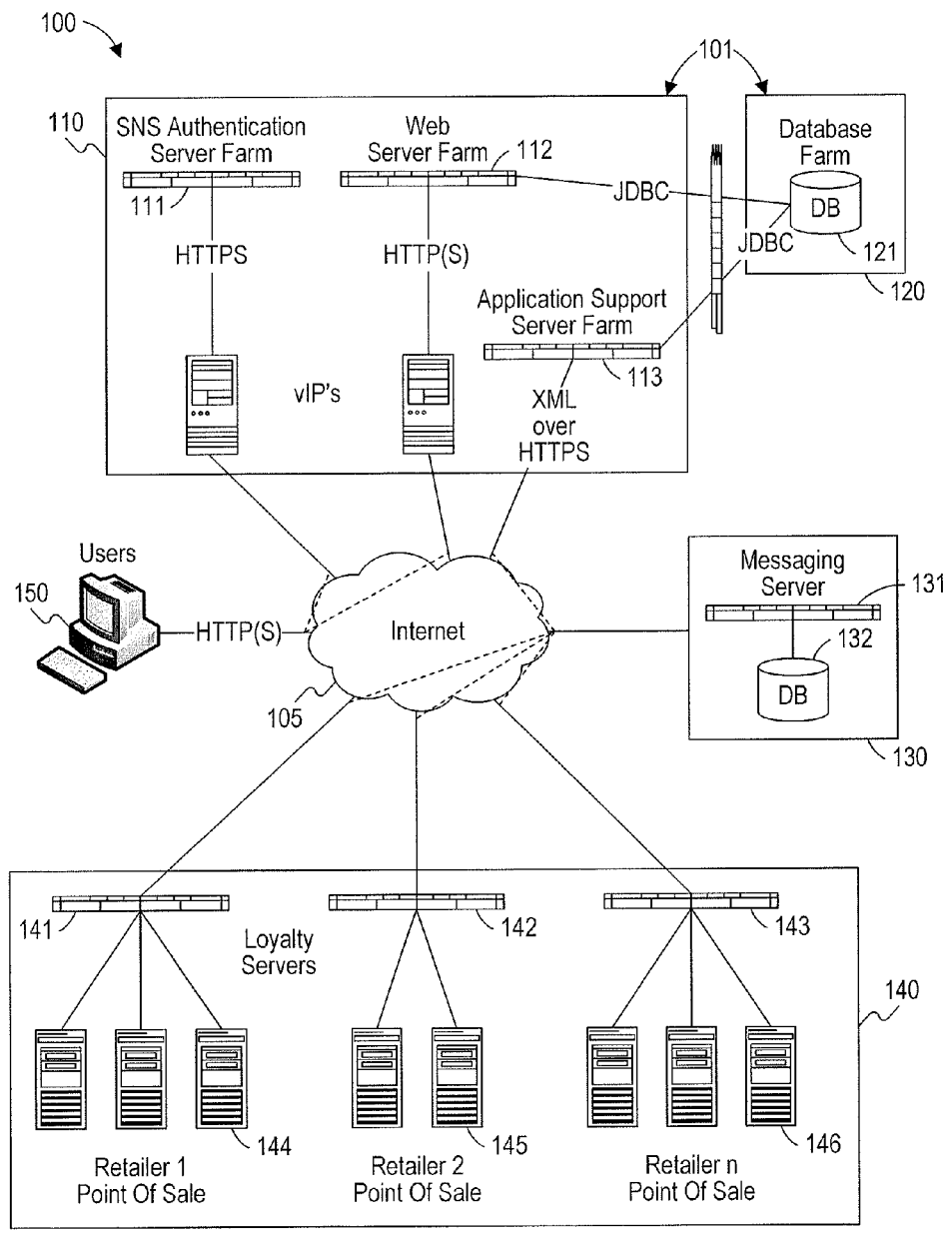
FIG. 1A is a block diagram of a system for providing and/or managing electronic coupons.

FIG 1A illustrates an example of a system 100 for providing and/or managing electronic coupons. The electronic system 100 includes an application system 101, a messaging hub 130, one or more retailer systems 140, and one or more user systems 150. The application system 101, the messaging hub 130, the retailer Systems 140, and the user systems 150 communicate via network 105.

The network 105 facilitates communication between the application system 101, the messaging hub 130, the retailer systems 140, and the user systems 150. Examples of network 105 include the Internet, Wide Area Networks (WANs), Local Area Networks (LANs), analog or digital wired and wireless telephone networks (e.g., a Public Switched Telephone Network (PSTN)), an Integrated Services Digital Network (ISDN), a Digital Subscriber Line (xDSL), or a cellular network), or any other wired or wireless network. Network 104 may include multiple networks of subnetworks, each of which may include, for example, a wired or wireless data pathway. In one implementation, the network 105 includes the Internet and exchanges communications using standard Internet protocols. For example, communications may be exchanged between the application system 101, the messaging hub 130, the retailer systems 140, and the one or more user systems 150 using the hypertext transfer protocol (HTTP), the secure hypertext transfer protocol (HTTPS), the extensible markup language (XML), another compatible protocol, or a combination thereof. In implementations, some or all of the communications may be exchanged using proprietary protocols.

The application system 101 includes one or more application servers 110 and a database farm 120. The one or more application servers 110 may include an authentication server farm 111, a web server 112, and an application support server farm 113. The authentication server farm 111 is configured to perform authentication of users of the electronic coupon system 100. The authentication server 111 may authenticate users who access application system 101 using user systems 150. For example, users may be authenticated based on a user name and password entered by the user. The user name and password may be specific for the application system 110 or may be more general, such as a user name and password used For an Internet service provider or content provider that is hosting the application system 110. In another example, the authentication server 111 may authenticate a user automatically when the user accesses the application system 110 based on a cookie stored on a user system 150.

The web server farm 112 is configured to provide a web interface with which users may manage electronic coupons and associate them with retailer loyalty cards. For example, the web server farm 112 may provide an interface with which users may view, add, delete, and edit coupons and loyalty cards associated with their accounts. In one implementation, the web server farm 112 may communicate with user systems 150 using the HTTP or HTTPS protocol. The web server farm 112 further communicates with database 121 to store and retrieve information used to manage electronic coupons. The web server farm 112 may communicate with database 121 using, for example, the JDBC protocol.

The application support server farm 113 is configured to communicate with messaging hub 130 and retailer systems 140 to manage electronic coupons. The application support server farm 113 may also communicate with database 121, for example using the Java Database Connectivity (JDBC) protocol, to manage data stored in database 121 in accordance with communications with the messaging hub 130 and retailer systems 140. For example, the application support server farm 113 may send coupon information to messaging hub 130 and/or retailer systems 140 when database 121 is updated. In this example, the application support server farm 113 may send an identifier of an electronic coupon and information related to the terms of the electronic coupon to the messaging hub 130 and/or retailer systems 140 for local storage in response to the electronic coupon being added to database 121. For instance, to transmit the information related to the terms of the coupon, the application support server farm 113 may send the terms themselves, or send information identifying the terms, such as a barcode for the coupon. The application support server farm 113 may send the identifier of the electronic coupon and information related to the terms of the electronic coupon to the messaging hub 130 and/of retailer systems 140 prior to making the electronic coupon available for user selection. By sending the identifier of the electronic coupon and information related to the terms of the electronic coupon to the messaging hub 130 and/or retailer systems 140 for local storage, the application support server farm 113 may be able to later communicate with the messaging hub 130 and/or retailer systems 140 by sending only coupon identifiers. In addition, as another example, the application support server farm 113 may update database 121 when the application support server farm 113 receives communications from messaging hub 130 and/or retailer systems 140 indicating that coupons have been redeemed. In one implementation, the application support server farm 113 communicates with messaging hub 130 directly via network 105 and messaging hub 130 forwards information support server farm 113 to retailer systems 140, and vice versa. The application support server farm 113 may communicate via network 105 using XML over HTTPS.

The database farm 120 includes at least one database 121. The database 121 stores information for managing electronic coupons and communicates with the application servers 110 to facilitate management of electronic coupon data. In one implementation, the database 121 communicates with the application servers through a firewall using the JDBC protocol.

Figures 1, 1B:
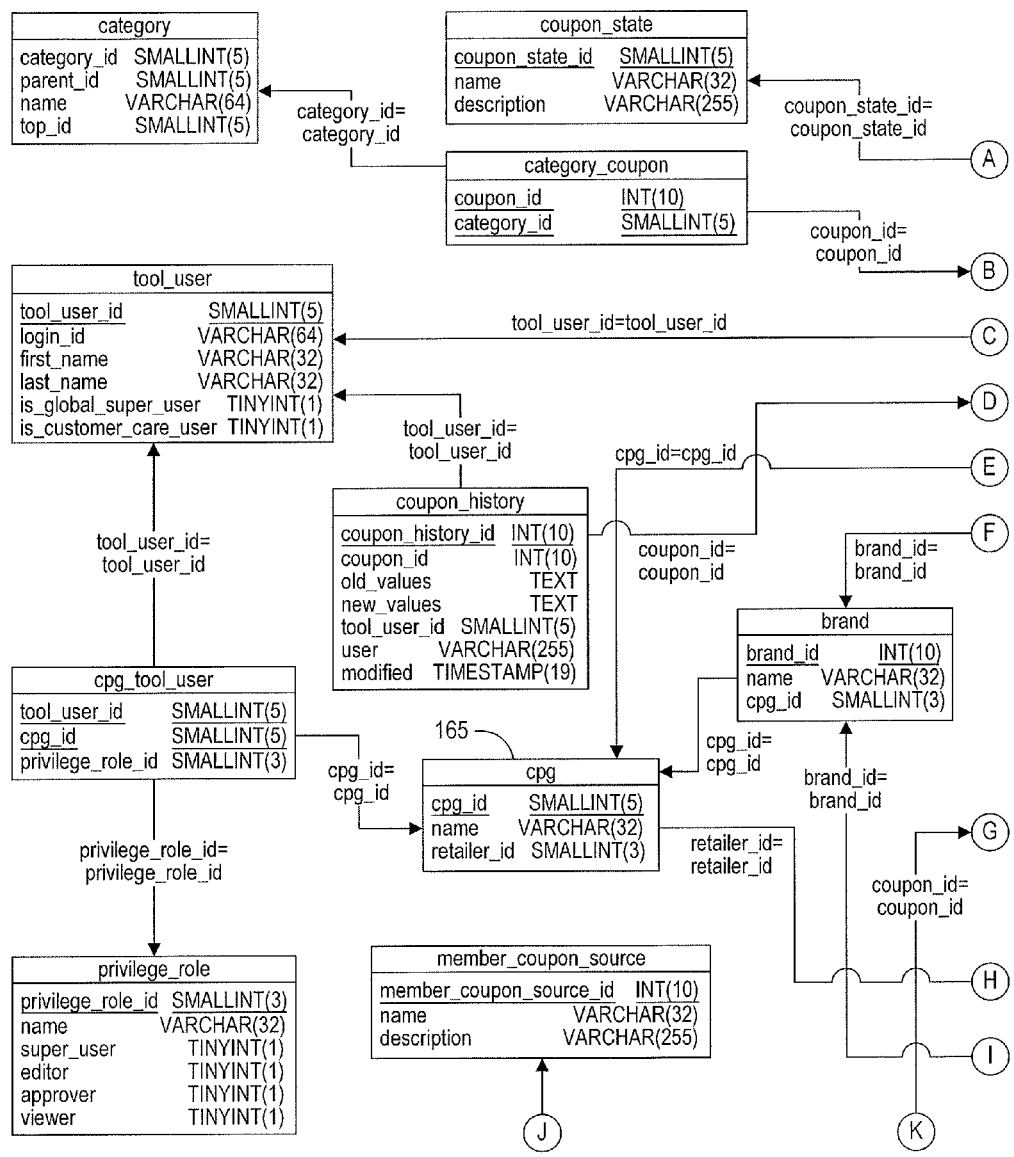
FIG 1B is an entity relationship diagram detailing an example of a data structure of a database used in a system for providing and/or managing electronic coupons.
Figures 1, 1B, 2:
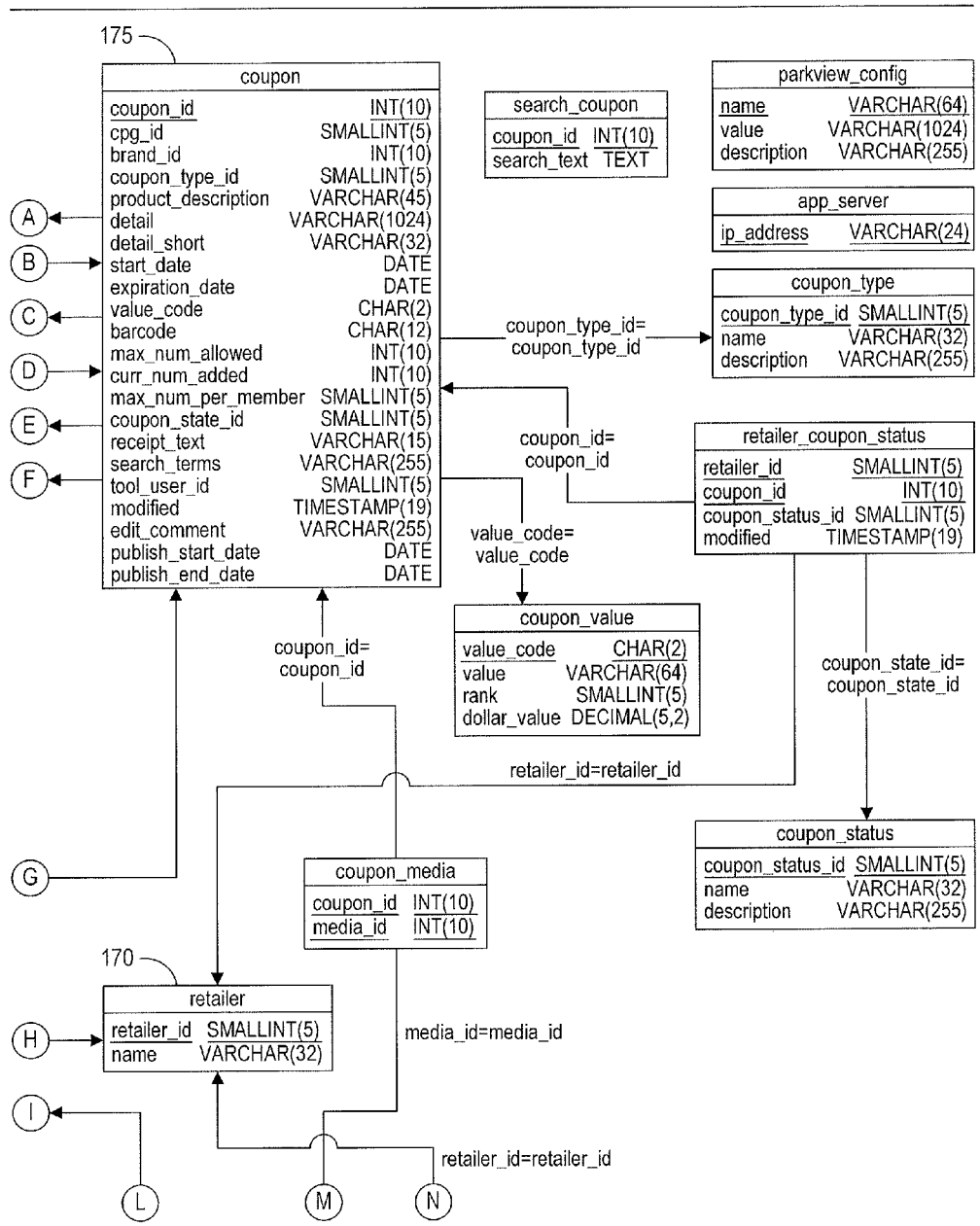

FIG 1B illustrates an exemplary entity relationship diagram 100B detailing an example of a data structure of database 121. As shown in FIG. 1B, the database 121 may include, for example, a data structure related to members 160, a data structure related to consumer packaged goods manufacturers 165, a data structure related to retailers 170, a data structure related to coupons 175, and a data structure related to saving cards 180.

Referring again to FIG. 1A, the messaging hub 130 includes a messaging server 131 and a database 132. The messaging server 131 is configured to exchange communications between application support server farm 113 and retailer systems 140. For example, the messaging server 131 may receive a message from application support server farm 113 indicating that a user has added a coupon to his or her loyalty card(s). In response, the messaging server 131 may forward the message to each of the loyalty servers 141-143 associated with the loyalty card(s) to which the user has added a coupon. In another example, the messaging server 131 may receive a message from one of the retailer systems 140 indicating that a customer has redeemed a coupon at the retailer. In response, the messaging server 131 may forward the message to the application support server farm 113 and the other retailer systems 140. The message forwarding performed by the messaging hub 130 may ensure integrity and consistency of coupon information stored at the application support server farm 113 and the retailer systems 140. For example, when a consumer redeems a coupon at a retail store associated with one of the retailer systems 140, the messaging hub 130 receives information indicating the redemption and may forward the information indicating the redemption to the other retailer system 140 to cause the other retailer systems to prevent the consumer from redeeming the coupon a second time at a retail Store associated with one of the other retailer systems 140. The messaging server 131 may communicate with application support server farm 113 and retailer systems 140 using one or more protocols supported by network 105. The messaging hub 130 also includes a database 132. The database 132 may store information used by the messaging server 131 to exchange communications between the application support server farm 113 and the retailer systems 140. The database 132 may also store information for managing electronic coupons.

In one implementation, each retailer system 140 includes a retailer point of sale system 144, 145, or 146 and a corresponding loyalty server 141, 142, or 143. In another implementation, a single loyalty server may correspond to multiple retailer point of sale systems or a single retailer point of sale system may correspond to multiple loyalty servers. Each retailer system 140 may be owned and operated by different or the same retailers.

The retailer point of sale systems 144, 145, and 146 may be configured to process transactions occurring at the retailer. When a user uses a loyalty card at a retailer (e.g., by swiping a magnetic strip on the card at a point of sale system), the retailer point of sale systems 144, 145, and 146 communicate with the corresponding loyalty server 141, 142, and 143 to process coupons associated with the loyalty card. For example, the loyalty server 141, 142, or 143 may store coupon information associated with the loyalty card. When the loyalty card is used, the point of sale system 144, 145 or 146 may access this coupon information, and compare it to the goods being purchased and automatically redeem coupons as appropriate. The loyalty servers 141, 142, or 143 communicate with messaging server 131 to receive information regarding coupons that are associated with the loyalty card and to provide information indicating that a coupon has been redeemed, or other information related to a loyalty card (e.g., that the user has canceled the loyalty card).

User systems 150 include one or more electronic systems that a user may use to communicate with authentication sewer farm 111 and web server farm 112 to manage coupons and loyalty cards associated with the user's account.

Figure 2A:
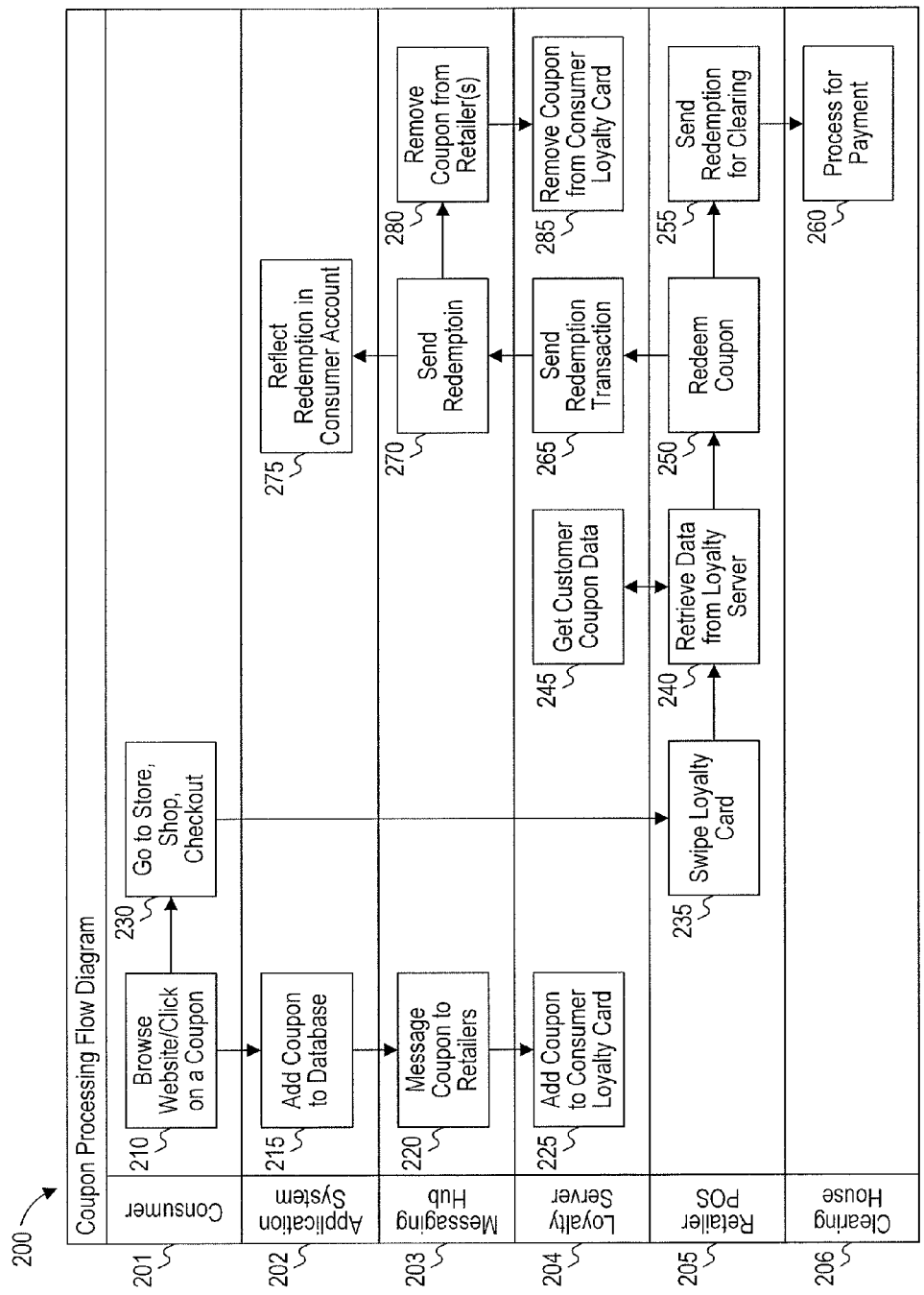
FIG 2A is a flow diagram illustrating an example of an operation of an electronic coupon management system.

FIG. 2A is a flow diagram 200 illustrating an example of an operation of an electronic coupon management system (e.g., electronic coupon management system 100). The operations may be performed by a consumer 201 (e.g., users of user systems 150), an application system 202 (e.g., application system 101), a messaging hub 203 (e.g., messaging hub 130), a loyalty server 204(e.g., loyalty server 141, 142, or 143), a point of sale retailer 205 (e.g., retailer point of sale system 144, 145, or 146), and a clearing house 206.

A consumer 201 browses a website and selects a coupon the consumer wishes to add to his or her account (and, therefore, associated loyalty cards) (210). The application system 202 receives the selection, associates the coupon with the user's account, and adds the coupon to a database that stores coupon information (215). The messaging hub 203 receives a message indicating that the user has added the coupon and sends a message to the retailer loyalty server 204 indicating that the user has added the coupon (220). In one example, the message to the retailer loyalty server 204 includes an identifier for the user and an identifier for the added coupon. In this example, the message may not include the terms of the added coupon because the terms have been previously sent to or otherwise known by the retailer loyalty server 204. The loyalty server 204 receives the message from the messaging hub 203 and associates the coupon with the consumer's 201 loyalty card in the loyalty server 204 (225). At this point, the consumer 201 may redeem the added coupon by using his or her loyalty card.

To redeem coupons associated with a loyalty card, the consumer 201 goes to a store, selects goods for purchasing and proceeds to checkout (230). The point of sale retailer 205 swipes the consumer's 201 loyalty card (235). In other examples, the point of sale retailer 205 may determine the consumer's 201 loyalty card information in another manner or may use another type of identifier for the consumer 201. In response to receiving the consumer's 201 loyalty card information, the point of sate retailer 205 requests coupon data from the loyalty server 204 (240). The loyalty server accesses coupon data associated with consumer's loyalty card and sends the data to the point of sale retailer 205 (245). The point of sale retailer 205 receives the coupon data from the loyalty server 204 (240) and redeems coupons corresponding to goods that the consumer 201 is purchasing (250). Then, the point of sale retailer sends the redemption for clearing (255) and clearing house 206 processes the coupon redemption for payment to the point of sale retailer 205 (260).

In addition to sending the coupon for redemption, the point of sale retailer sends information to loyalty server 204 indicating the coupons that the consumer 201 has redeemed (250). The loyalty server 204 receives redemption information from the point of sale retailer and sends information indicating the redemption transaction to messaging hub 203 (265). The loyalty server 204 may also update the coupon data stored on the loyalty server 204 for the consumer 201 based on the coupons that the consumer 201 has redeemed. For example, the loyalty server 204 may delete or otherwise disassociate the redeemed coupons from coupon data stored for the consumer 201. The messaging hub 203 receives the information indicating the redemption transaction and sends the redemption information to the application system 202 (270). The application system 202 receives the redemption information and updates the database to reflect the redemption in the consumer's account (275). For example, the application system 202 may delete or otherwise disassociate the redeemed coupons from the consumer's 201 account. The messaging hub 203 also sends the redemption information other retailers participating in the electronic coupon system indicating that the other retailers should remove the coupon from the consumer's loyalty card because the coupon has been redeemed (280). In one implementation, the redemption information may include an identifier for the consumer 201 and identifiers for the coupon the consumer 201 has redeemed. The loyalty server 204 (and other loyalty servers) receive the message and remove the coupon from the consumer's loyalty card (285). For example, the loyalty server 204 (and other loyalty servers) may delete or otherwise disassociate the redeemed coupons from coupon data stored at the loyalty server 204 (and other loyalty servers) for the consumer 201. By deleting or otherwise disassociating the redeemed coupons, the loyalty server 204 (and other loyalty servers) may prevent the consumer 201 from redeeming the coupon multiple times.

Figure 2B:
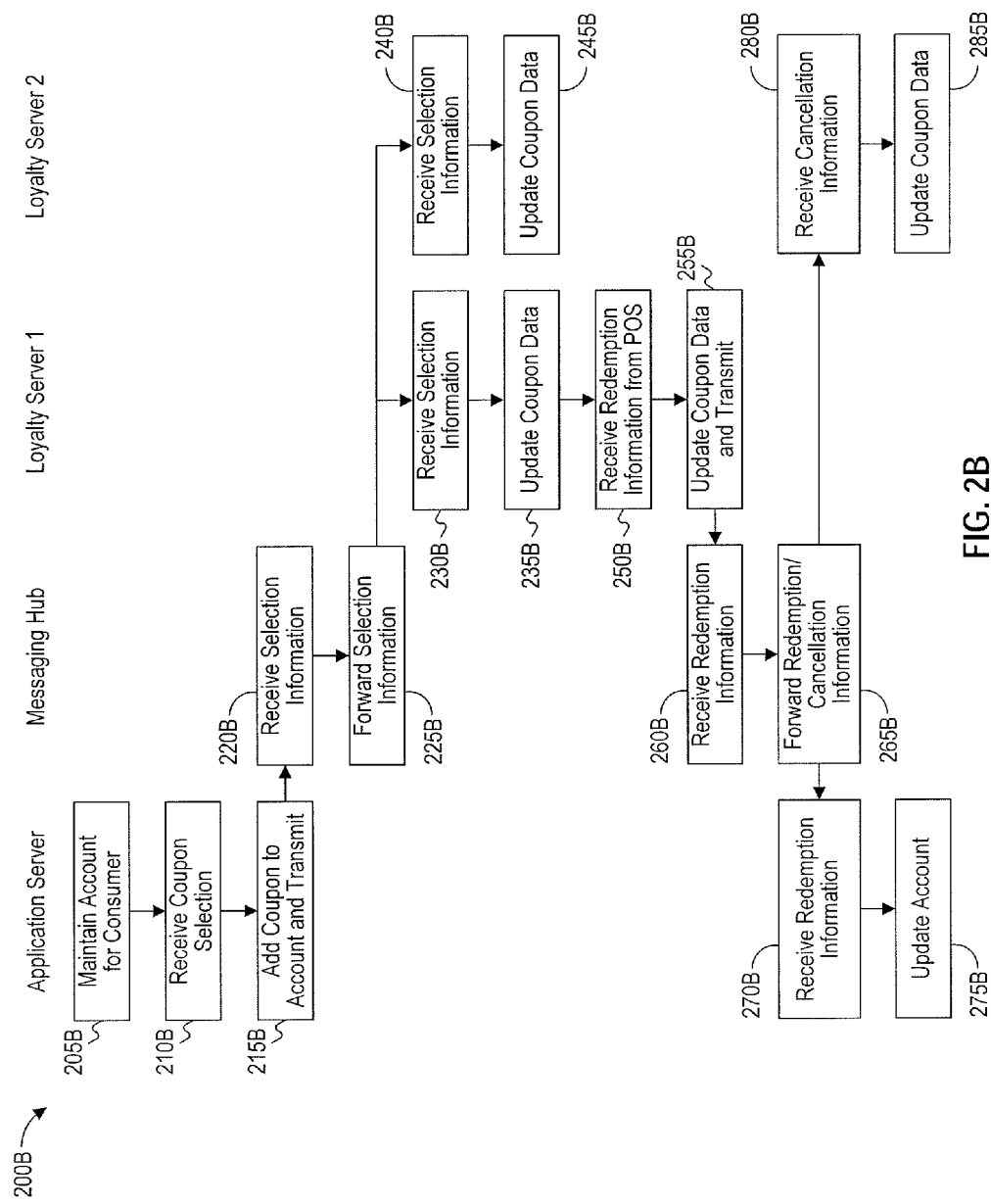
FIG 2B is a flowchart of a process for handling electronic coupons for different retail entities.
Figure 3:
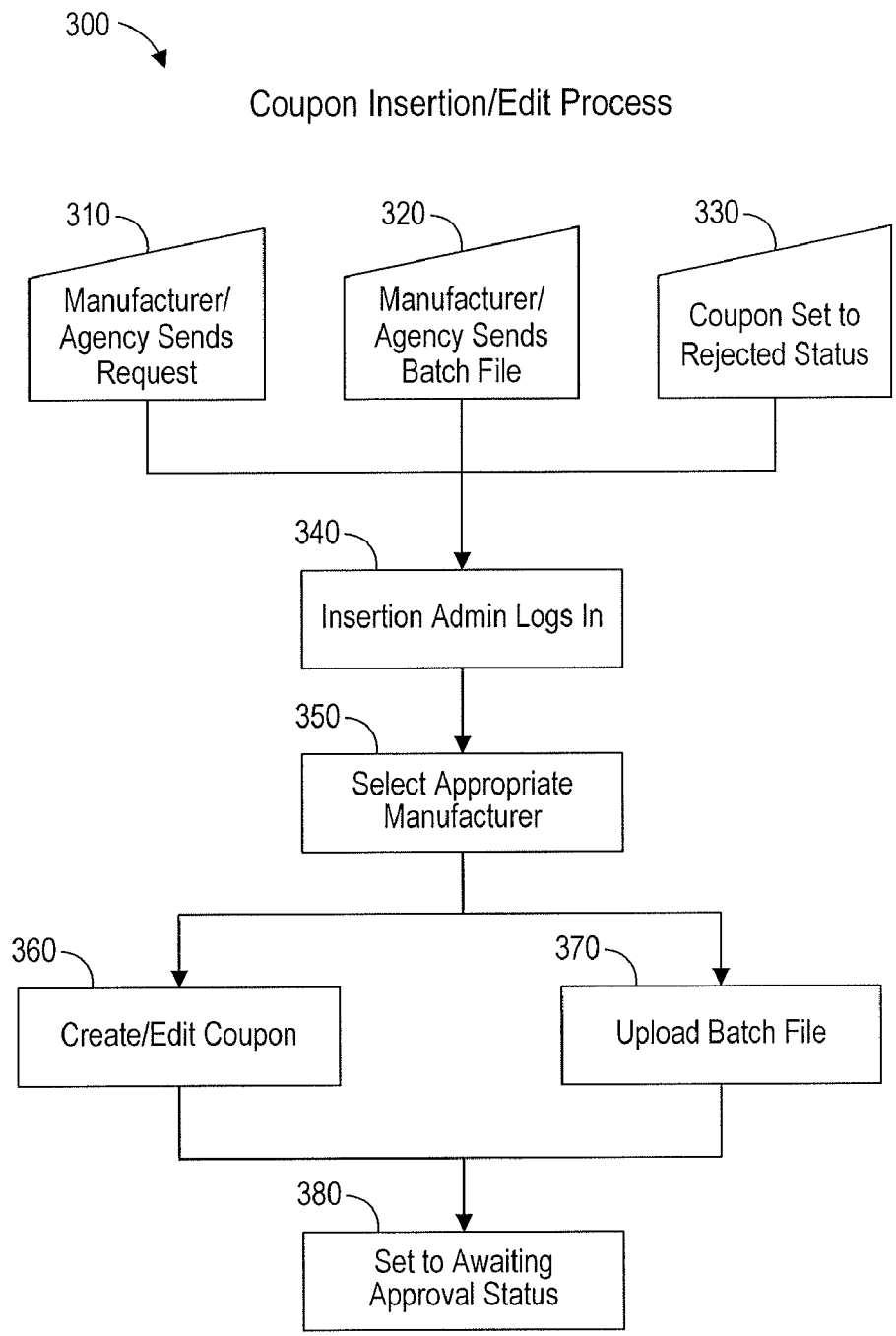
Figure 4:
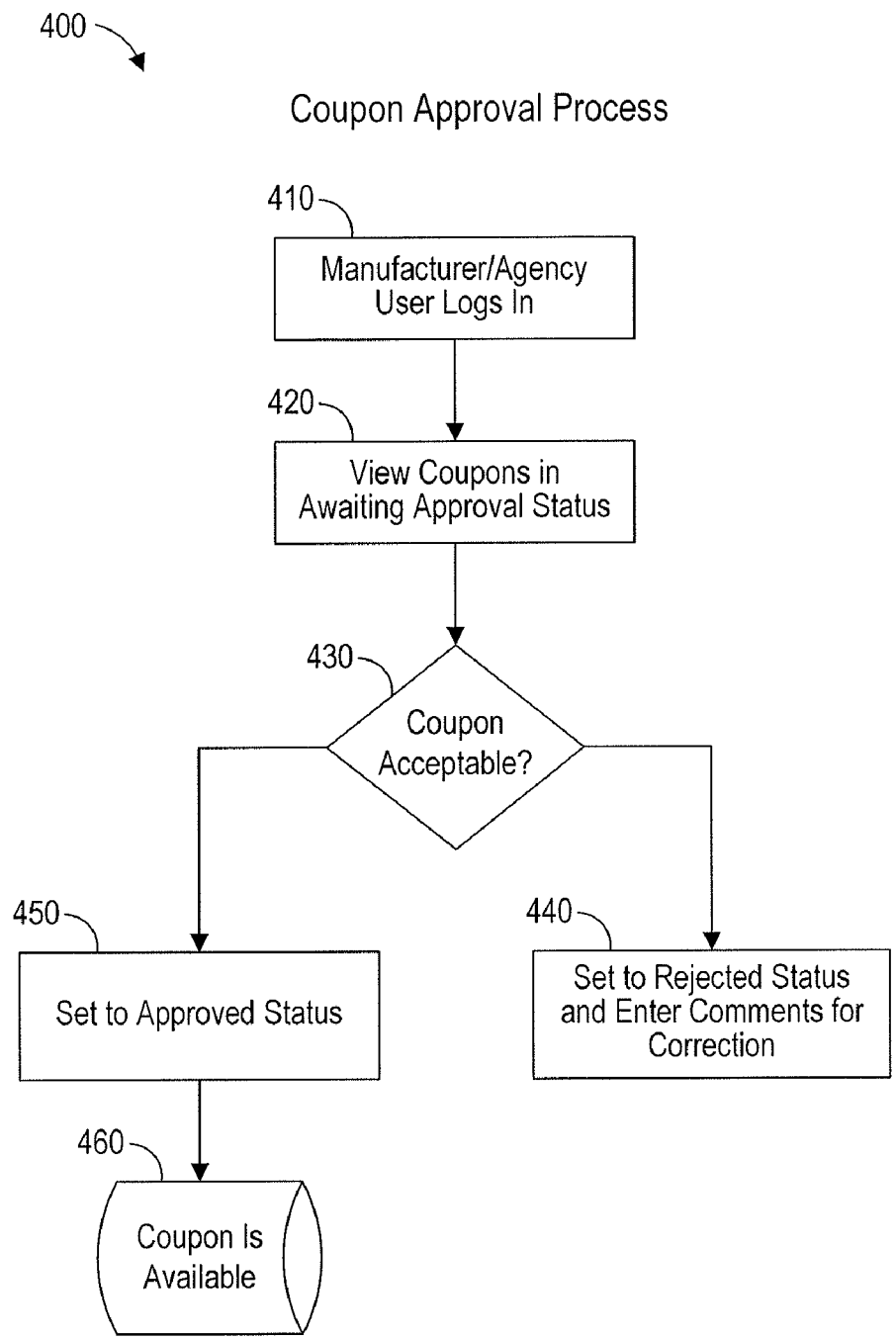

FIG 2B is a flowchart showing an example of a process 200B for handling electronic coupons for multiple different retailers. The process may be performed by an application server (e.g., application system 101), a messaging hub (e.g., messaging hub 130), a first loyalty server (e.g., loyalty server 141), and a second loyalty server (e.g., loyalty server 142).

The application/server maintains an account for a user of an electronic coupon system (205B). The account may include personal information identifying the user and may also include coupon data associated with the user. In addition, the account may include information associating the user with one or more retail entities. In the implementation shown in FIG 2B, the account for the user includes information associating the user with a first retail entity associated with one or more retail stores and a second retail entity associated with one or more retail stores. The second retail entity is different than the first retail entity. In this implementation, the first retail entity is associated with the first loyalty server and the second retail entity is associated with the second loyalty server.

The application server receives a coupon selection from the user (210B). For example, the application server may have presented a list of available coupons in a web page over a network to the user and the user may have selected a coupon by interacting with the web page. The selection of the coupon may be an indication that the user wishes to add the selected coupon to the user's account and associate the selected coupon with the first and second retail entities such that the user may redeem the coupon at a retail store associated with the first or second retail entities. A retail store may include a traditional brick and mortar retail store, an online retail store, or any other type of store with which a consumer may purchase goods or services. In one implementation, the coupon selected may be associated with the first retail entity, but not the second retail entity. In this implementation, the process proceeds according to FIG 2B, except that coupon selection information and coupon redemption information is not sent to the second loyalty server.

The application server adds the coupon, to the user's account and transmits coupon selection information to the messaging hub (215B). For example, the application server may associate the selected coupon with the user's account by storing a coupon identifier that identifies the coupon in association with the user's account. In another example, the application server may associate the selected coupon with the user's account by storing a coupon identifier and coupon terms in association with the user's account. The application server also transmits coupon selection information to the messaging hub. In one example, the application server transmits the coupon selection information prior to or concurrently with updating the user's account. In another example, the application server transmits the coupon selection information after updating the user's account. The application server may transmit as coupon selection information a user identifier (e.g., a user account number, one or more loyalty card numbers, etc.) with coupon terms (e.g., full coupon data) to the messaging hub or may transmit as coupon selection information a user identifier (e.g., a user account number, one or more loyalty card numbers, etc.) with only coupon identifiers for the coupons selected. In the example in which the application server transmits as coupon selection information a user identifier with only coupon identifiers for the coupons selected, the terms of the coupons available for selection by users may have previously been transmitted to or otherwise made available to the messaging hub and/or the first loyalty server and the second loyalty server.

Although the application server has been described as receiving a selection of an electronic coupon from a user and adding the selected electronic coupon, to the user's account, coupons may alternatively or additionally be associated with a user's account in other manners. For example, coupons may be automatically added to a user's account. In this example, manufacturers, retailers, the application server, or other entities may automatically add electronic coupons to the user's account. In one implementation, a manufacturer, a retailer, the application server, or another entity may automatically add a coupon to the user's account for all retail entities associated with the user's account such that the coupon may be redeemed at a retail store associated with any retail entity associated with the user's account. For example, a manufacturer may add an electronic coupon for a particular product that is redeemable at all retail entities associated with a user's account to promote the particular product. In this example, the application server or an electronic device associated with a retail store or the manufacturer may alert the user of the automatic association of the electronic coupon with the user's account. In another example, the application server may add a generic coupon to all retail entities associated with the user's account. The generic coupon may apply to any product or one or more specific products. In this example, the application server may offer the generic coupon as an incentive to use the system or may offer the electronic coupon to promote customer service.

In another implementation, a manufacturer, a retailer, the application server, or another entity may automatically add a coupon to the user's account such that the coupon may be redeemed at a retail store associated with a specific retail entity associated with the user's account. For example, a retailer may automatically add an electronic coupon to the user's account associated with the retailer to promote the user to shop at a retail store associated with the retailer. The electronic coupon may be for any product or a specific product.

In further implementations, automatic association of electronic coupons may be for a specific users, a group of users, or for all users of the electronic coupon management system. For example, electronic coupons may be added to users on a targeted basis. In this example, a manufacturer may automatically add an electronic coupon for a particular product to accounts of all users that share a common property or have a similar shopping history. Other implementations may allow for other forms of automatic association of electronic coupons with user accounts.

The messaging hub receives the coupon selection information (220B) and forwards the coupon selection information to the first loyalty server and the second loyalty server (225B). For example, the messaging hub may store information identifying loyalty servers associated with users who have accounts with the application server. In this example, the messaging hub may access a user identifier (e.g., a user account number) in the coupon selection information, determine that the first loyalty server and the second loyalty server are associated with the user based on the user identifier, transmit the coupon selection information to the first loyalty server with information sufficient to identify the user to the first loyalty server (e.g., a first loyalty card number for the first loyalty server), and transmit the coupon selection information to the second loyalty server with information sufficient to identify the user to the second loyalty server (e.g., a second loyalty card number for the second loyalty server). In another example, the messaging hub may receive coupon selection information that includes a first loyalty card number and a second loyalty card, transmit the coupon selection information to the first loyalty server associated with the first loyalty card number, and transmit the coupon selection information to the second loyalty server associated with the second loyalty card number. The coupon selection information transmitted to the first loyalty server and/or the second loyalty server may include coupon terms or only coupon identifiers of the coupons selected by the users.

In other implementations, the messaging hub may receive and forward information indicating association of an electronic coupon with a user's account. In one implementation, the information may indicate that the electronic coupon was automatically added to the user's account. In this implementation, the messaging hub may forward the information indicating that the electronic coupon was automatically added to the user's account and the first loyalty server and the second loyalty server may handle the electronic coupon accordingly. For example, the first loyalty server or the second loyalty server (or another system) may be configured to alert the user of the automatic association of the electronic coupon with the user's account. In this example, the first loyalty server or the second loyalty server may be configured to alert the user prior to the user shopping at a retail store associated with the first loyalty server or the second loyalty server, prior to the user proceeding to checkout when shopping at a retail store associated with the first loyalty server or the second loyalty server, or at checkout when the user is shopping at a retail store associated with the first loyalty server or the second loyalty server.

In another implementation, the information indicating association of an electronic coupon with a user's account may solely indicate association of the electronic coupon with the user's account and provide no indication of the manner in which the electronic coupon was associated with the user's account. For example, the messaging hub may receive and forward the same information indicating association of an electronic coupon with the user's account regardless of whether the customer selected the electronic coupon or the coupon was automatically added to the user's account. In another example, the messaging hub may receive information indicating coupon selection or information indicating automatic association of the coupon and translate the received information to information solely indicating association of the electronic coupon with the user's account. In this example, the messaging hub may transmit the translated information solely indicating association of the electronic coupon with the user's account to the first loyalty server and the second loyalty server.

The first loyalty server receives the coupon selection information (230B) and updates coupon data based on the coupon selection data (235B). For example, upon receipt of the coupon selection information, the first loyalty server may associate a selected electronic coupon with the user such that the user may redeem the selected electronic coupon at a retail store associated with the first retail entity upon presentation of a first user identifier (e.g., a first loyalty card number). In one implementation, the first loyalty server may store the terms of the selected electronic coupon in association with an account of the user on the first loyalty server. In another implementation, the first loyalty server may associate an identifier for the selected electronic coupon with an account of the user on the first loyalty server. In this implementation, the identifier may reference coupon terms for the coupon that have been previously transmitted or otherwise made available and stored in electronic storage of the first loyalty server.

The second loyalty server receives the coupon selection information (240B) and updates coupon data based on the coupon selection data (245B) in a manner similar to that described above with respect to the first loyalty server.

The first loyalty server receives redemption information associated with the selected electronic coupon from a point of sale (250B). For example, the first loyalty server may receive a message from a point of sale system located in a retail store associated with the first loyalty server indicating that the user has redeemed the selected electronic coupon. In this example, the message may include a user identifier and a coupon identifier. The point of sale may determine this information by first retrieving from the loyalty server a list of the coupons associated with the user, and then reviewing the products being purchased by the user to determine if any of the coupons can be applied to the purchases. The point of sale system can then communicate the redeemed coupons to the loyalty server.

In another example, the first loyalty server may receive a message from a point of sale system located in a retail store associated with the first loyalty server indicating the products the user has purchased. In this example, the first loyalty server may compare the product information with coupon data, determine that the user has met the terms of the selected electronic coupon, and automatically redeem the selected electronic coupon (e.g., send redemption information to the POS or a clearinghouse to credit the user).

The first loyalty server updates the coupon data associated with the first loyalty server and transmits the redemption information to the messaging hub (255B). For example, the first loyalty server may cancel the redeemability of the electronic coupon. To that end, the first loyalty server may delete the electronic coupon or disassociate the electronic coupon from the user's account on the first loyalty server. In another example, the first loyalty server may maintain the electronic coupon in association with the user's account on the first loyalty server, but may cancel the redeemability by modifying the data associated with the electronic coupon or storing additional information indicating that the user should no longer be permitted to redeem the electronic coupon. Canceling the redeemability of the coupon may prevent the user from redeeming the selected electronic coupon for a second time at a retail store, associated with the first loyalty server.

The first loyalty server also transmits redemption information to the messaging hub. In one example, the first loyalty server transmits the redemption information prior to or concurrently with updating the user's account. In another example, the first loyalty server transmits the redemption information after updating the user's account. The first loyalty server may transmit as redemption information a user identifier (e.g., a user account number, the first loyalty card number, etc.) with coupon terms (e.g., full coupon data) to the messaging hub or may transmit as redemption information a user identifier (e.g., a user account number, the first loyalty card number, etc) with only coupon identifiers for the coupons redeemed.

Other implementations may involve the user redeeming the selected electronic coupon at the second loyalty server instead of the first loyalty server. In these implementations, the second loyalty server receives redemption information associated with the selected electronic coupon from a point of sale, updates the coupon data associated with the second loyalty server, and transmits the redemption information to the messaging hub in a manner similar to that described above with respect to the first loyalty server.

The messaging hub receives the redemption information (260B) and forwards information to five application server and the second loyalty server (265B). For example, the messaging hub may transmit a user identifier for the user with a coupon identifier for the redeemed coupon to the application server and the second loyalty server. In one implementation, the messaging hub may transmit redemption information to the application server and cancellation information to the second loyalty server. In this implementation, the cancellation information may not indicate that the user has redeemed the coupon, but merely that the coupon should no longer be permitted to be redeemed, while the redemption information may indicate the fact that the coupon was redeemed. For example, the cancellation information may be the same for any situation in which the coupon should no longer be redeemed regardless of the reason why the coupon should no longer be redeemed (e.g., redemption of the coupon by the user, expiration of the coupon, or cancellation of the coupon by the issuer). The messaging hub may receive cancellation information from the first loyalty server or may receive the information indicating redemption and translate the redemption information to cancellation information prior to transmitting to the loyalty servers.

The application server receives the redemption information (270B) and updates the user's account on the application server (275B). For example, the application server may disassociate the redeemed coupon with the user's account by deleting a coupon identifier that identifies the coupon in association with the user's account. In another example, the application server may disassociate the redeemed coupon with the user's account by deleting a coupon identifier and coupon terms in association with the user's account. In a further example, the application server may disassociate the redeemed coupon with the user's account by modifying information associated with the user's account that indicates that the coupon has been redeemed. In this example, the application server may maintain a coupon identifier for the redeemed coupon in association with the user's account, but store additional data indicating that the coupon has been redeemed. By storing additional data indicating that the coupon has been redeemed, the application server may track coupon redemption information for the user and may prevent the user from adding the redeemed coupon to the user's account a second time.

The second loyalty server receives the cancellation information (280B) and updates the coupon data associated with the second loyalty server (285B). For example, the second loyalty server may update coupon data in manner similar to that described above with respect to the first loyalty server. By updating the coupon data, the second loyalty server may prevent the user from redeeming the selected electronic coupon at a retail store associated with the second loyalty server because the user has already redeemed the selected electronic coupon at a retail store associated with the first loyalty server.

Although an application server and a messaging hub have been described as performing operations shown in FIG 2B, a single system may be used to perform the operations. For example, instead of the messaging hub accessing the information indicating association of an electronic coupon with a user's account by, e.g., receiving it from the application server and then forwarding the information to the first loyalty server and the second loyalty server, the application server may access the information indicating association of an electronic coupon with a user's account from a local or remote electronic storage (or otherwise access the information) and forward the information directly to the first loyalty server and the second loyalty server.

In one implementation, discussed with respect to FIG 1A, the various systems included in the electronic coupon management system 100 communicate using XML. Table 1 below provides a list of transactions that may be implemented using XML and used to implement flow diagram 200 and/or 200B.

TABLE 1

| Transaction Name | Direction | Request | Response | Description |
| --- | --- | --- | --- | --- |
| addMembers | Application System –> Messaging Hub | transName: "addMembers" transStream: XML stream for addMembersRqst | XML stream for transactionResp | Add a list of Application System members. The necessary member info will be sent for marketing analysis. |

TABLE 1-continued

| Transaction Name | Direction | Request | Response | Description |
|---|---|---|---|---|
| removeMembers | Application System –> Messaging Hub | transName: "removeMembers" transStream: XML stream for removeMembersReqst | XML stream for transactionResp | Remove a list of Application System members |
| addSavingCards | Application System –> Messaging Hub | transName: "addSavingCards" transStream: XML stream for addSavingCardsReqst | XML stream for transactionResp | Add a list of saving cards for Application System members |
| removeSavingCards | Application System –> Messaging Hub | transName: "removeSavingCards" transStream: XML stream for removeSavingCardsReqst | XML stream for transactionResp | Remove a list of saving cards for Application System members |
| addCoupons | Application System –> Messaging Hub | transName: "addCoupons" transStream: XML stream for addCouponsReqst | XML stream for transactionResp | Add a list of coupons to the retailers associated with a list of saving cards for Application System members |
| removeCoupons | Application System –> Messaging Hub | transName: "removeCoupons" transStream: XML stream for removeCouponsRqst | XML stream for transactionResp | Remove a list of coupons from the retailers associated with a list of saving cards for Application System members |
| addCPGCoupons | Application System –> Messaging Hub | transName: "addCPGCoupons" transStream: XML stream for addCPGCouponsRqst | XML stream for transactionResp | Add a list of CPG coupons |
| couponSupport | Application System –> Messaging Hub | transName: "couponSupport" transStream: XML stream for couponSupportRqst | XML stream for transactionResp | Send all entries in category, cpg, and brand tables |
| adImpressionsReport | Application System –> Messaging Hub | transName: "adImpressionsReport" transStream: XML stream for adImpressionsReport | XML stream for transactionResp | Send Ad impressions |
| addedConfirmation | Messaging Hub Application System | transName: "addedConfirmation" transStream: XML stream for addedConfirmationReqst | XML stream for transactionResp | Notify Application System that a list of coupons have been successfully added to saving cards |
| removedConfirmation | Messaging Hub –> Application System | transName: "removedConfirmation" transStream: XML stream for removedConfirmationReqst | XML stream for transactionResp | Notify Application System that a list of coupons have been successfully removed for saving cards |
| redeemedConfirmation | Messaging Hub –> Application System | transName: "redeemedConfirmation" transStream:XML stream for redeemedConfirmationReqst | XML stream for redeemedConfirmationResp | Notify Application System that a list of coupons have been redeemed |
| cpgCouponsConfirmation | Messaging Hub –> Application System | transName: "cpgCouponsConfirmation" transStream: XML stream for cpgCouponsConfirmationRqst | XML stream for transactionResp | Notify Application System that a list of cpg coupons have been registered |
| toubledConfirmation | Messaging Hub –> Application System | transName: "troubledConfirmation" transStream: XML stream for troubledConfirmationReqst | XML stream for transactionResp | Notify Application System that a list of coupons have problems |
| invalidCardsConfirmation | Messaging Hub –> Application System | transName: "invalidCardsConfirmation" transStream: XML stream for invalidCardsConfirmationReqst | XML Stream for transactionResp | Notify Application System that a list of saving cards that is rejected by the retailers |
| getMembersRqst | Messaging Hub –> Application System | transName: "getMember" transStream: XML stream for getMembersRqst | XML stream for getMembersResp | Get member info |
| problemNotification | Messaging Hub –> Application System | transName: "problemNotification" transStream: XML stream for problemNotification | XML stream for transactionResp | Used for Messaging Hub to notify APPLICATION SYSTEM the existence and status of a problem. One example is the EME server is down for a retailer. |

The XML Schema reproduced below correspond to the transactions listed in Table 1 and may be used to implement flow diagrams 200 and 200B using electronic coupon management system 100 that includes a database having a data structure described by entity relationship diagram 100B. As shown below with respect to the addCoupons transaction, implementations may include transmitting only coupon identifiers from the messaging hub to manage electronic coupons. In these implementations, coupon terms have been previously transmitted or other wise made available to the loyalty servers. This is demonstrated by the addCpgCoupons transaction below, which includes the identifier of the coupon and the information related to the terms of the coupon. Specifically, the example addCpgCoupons transaction below includes the barcode, which designates certain conditions such as the product and amount of the coupon, and includes other terms such as, for example, maximum number of coupons that can be redeemed by a member and the dates the coupon is valid.

Figures 1, 1B, 2, 3:
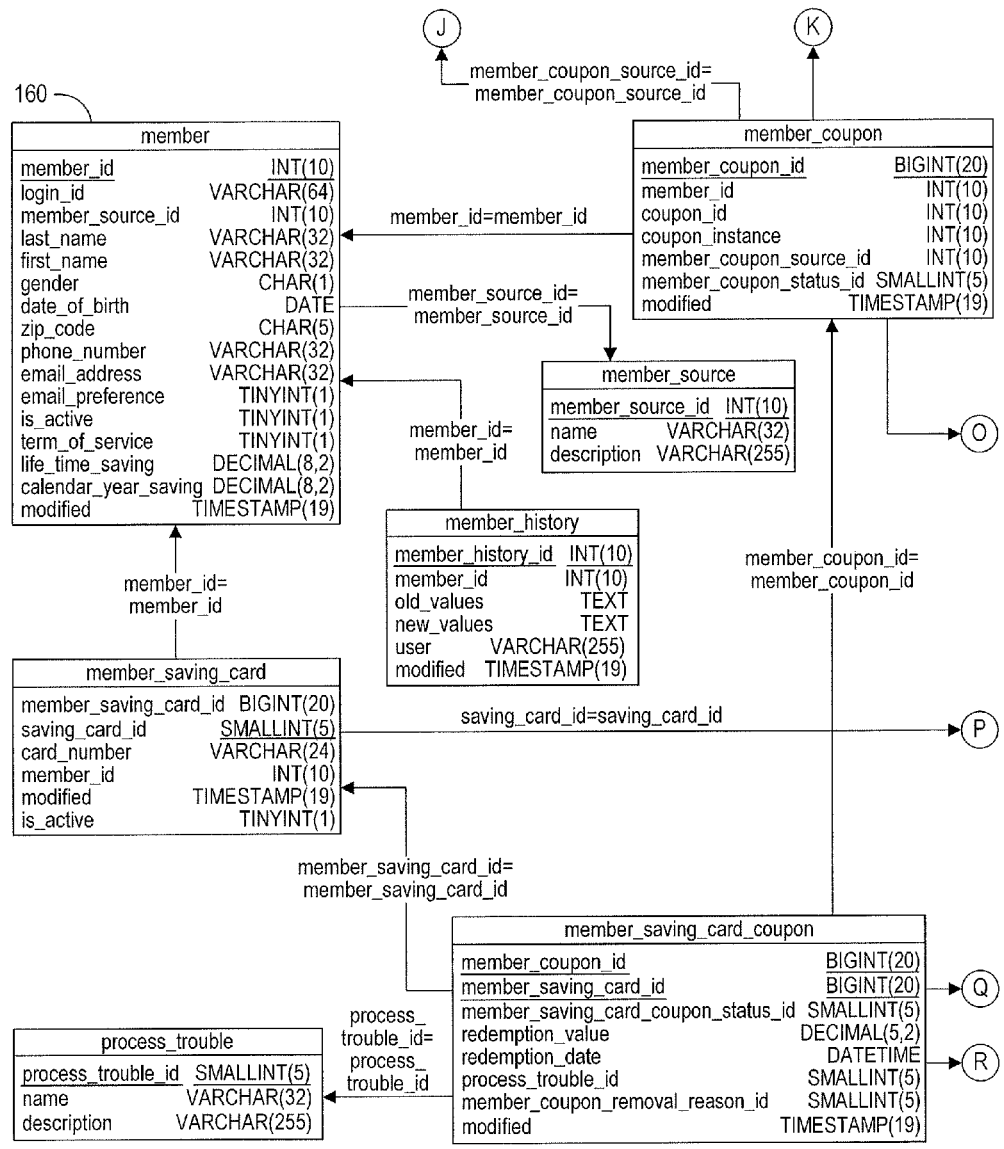
FIG 3 is a flow diagram illustrating an example of a process for adding or editing coupons made available to a user of an electronic coupon system.

FIG 3 is a flow diagram 300 illustrating an example of a process 300 for adding or editing coupons made available to user of an electronic coupon system. Process 300 may be performed, for example, by an insertion administration using application system 101.

The process 300 begins when a coupon or coupons are received from a manufacturer. To that end, a manufacturer or advertisement agency may send a request (310), may send a batch file of coupons (320), or a coupon set to rejected status may be submitted for reprocessing (330). An insertion administrator logs in to application system 101 (340) and selects an appropriate manufacturer for which to add coupons (350). The application system 101, in response to an instruction from the insertion administrator, creates a new coupon if a request from a manufacturer or agency is received and edits a coupon if the coupon was set to rejected status (360). If a batch file of coupons was received, the application system 101 uploads the batch file (370). After a coupon has been created, edited, or uploaded as part of a batch file, the coupon is set to awaiting approval status (380).

Figures 1, 1B, 2, 3, 4:
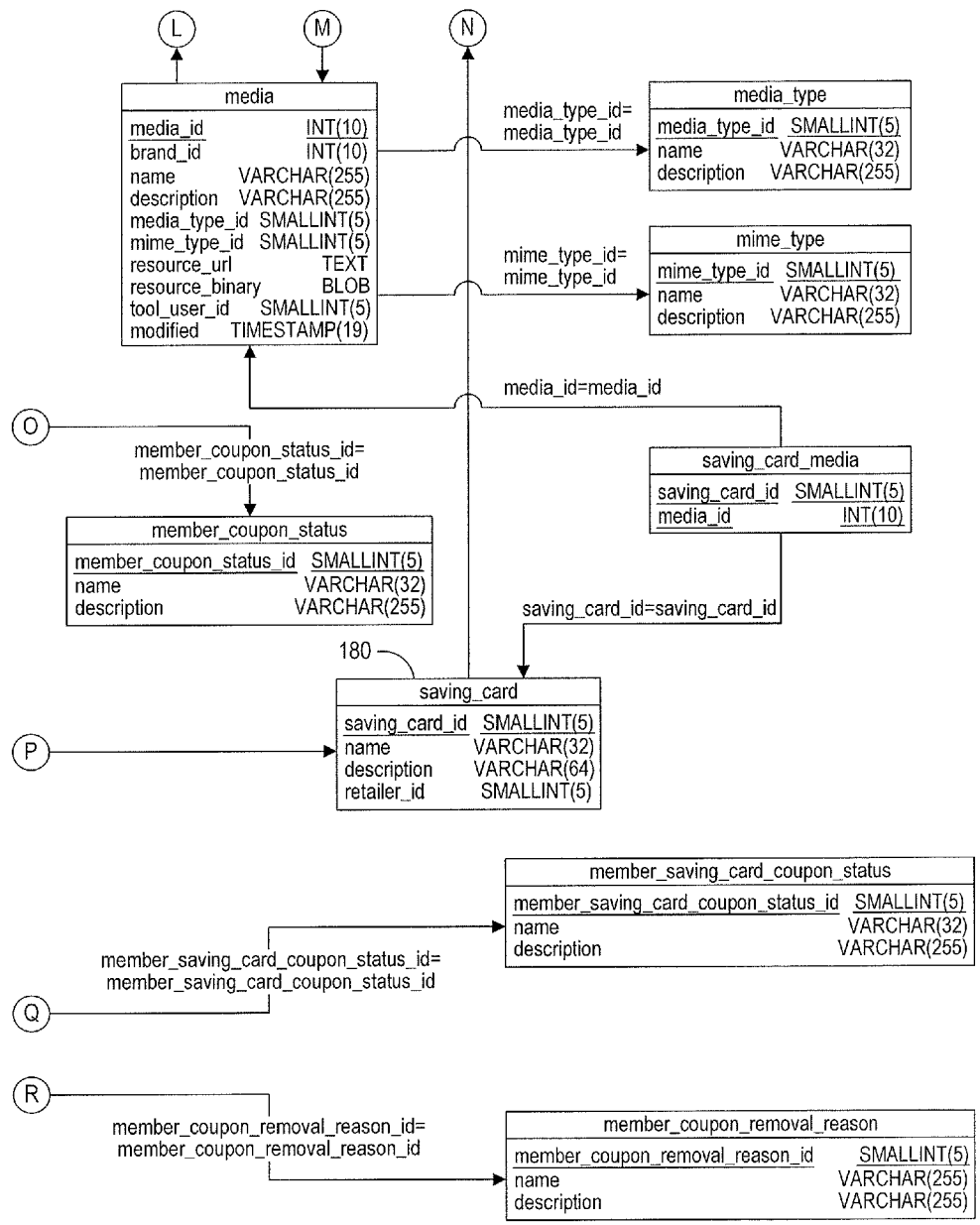
FIG 4 is a flow diagram illustrating an example of a process for approving coupons added to an application system.

FIG 4 is a flow diagram 400 illustrating an example of a process 400 for approving coupons added to the application system 101. Process 400 may be performed, for example, by a manufacturer/agency user using application system 101.

To approve a coupon in the application system 101 that is awaiting approval, a manufacturer or advertisement agency user logs in to application system 101 (410). The user views coupons that are in the status of awaiting approval (420). The user reviews the coupon and determines whether the coupon is acceptable (430). If the user determines that the coupon is not acceptable, the coupon is set to rejected status and the user enters comments setting forth the reasons for rejection and instructions for correction (440). Coupons set to rejected status are reprocessed by process 300. If the user determines that the coupon is acceptable, the coupon is set to approved status (450). The application system 101 adds coupons set to approved status to the database and makes the coupon available to users of the electronic coupon management system (460). Making the coupon available (460) may also include transmitting an identifier for the coupon and terms for the coupon to a messaging hub and/or one or more loyalty servers for local storage of the available coupon information.

In one implementation, users attempting to interact with application system 101 in performing processes 300 and 400 may have different privileges. For example, some users may be able to add coupons whereas other users may not and some users may be able to approve coupons whereas other users may not. In another example, a user may be able to add and approve coupons for one manufacturer, but may not be able to add and approve coupons for another manufacturer. In one implementation, application system 101 may utilize the type of users, the privilege roles, the database tables, and the database interface in Tables 2-5 reproduced below.

Types of Tool Users
Four types of tool users may be used.

TABLE 2

| User Type | Description |
|---|---|
| Super User | The user can create, modify, approve, reject, view coupons |
| Coupon Editor | The user can create and modify the coupons. The user can also move the coupon state |
| Coupon Approver | The user can approve or reject a coupon |
| Coupon Viewer | The user can view coupons |

Privilege Roles
The following privilege roles may be applied.

TABLE 3

| Role Name | Is super user | Can Edit Coupon | Can approve coupon | Can view Coupon |
|---|---|---|---|---|
| super_user | x | X | x | x |
| coupon_editor | | X | | x |
| coupon_approver | | | x | x |
| coupon_viewer | | | | x |

Database Tables
The following three tables may be used.

TABLE 4

| Table Name | Description | Notes |
|---|---|---|
| tool_user | This table is for the users of the insertion tool<br>user_id: The id of the user<br>sns_name: SNS name of the user<br>first_name: first name of the user<br>last_name: last name of the user<br>is_global_super_user: Is the user a super user for all CPGs. | 1. sns_name will be a unique key to enforce there is only one entry for a user.<br>2. If is_super_user flag is true, the user has all the privileges |
| cpg_tool_user | This table ties cpg and tool_user tables together. An entry in the table indicates that the user has a specific privilege on the coupons of the CPG.<br>user_id: The id of the user in tool_user table<br>cpg_id: The id of the CPG in cpg table<br>role_id: The id of a privilege role in privilege_role table | |
| privilege_role | This table has a list of privilege roles<br>role_id: The id of a role<br>role_name: The name of the role<br>super_user: Is the user a super user<br>editor: Can the user create/edit the coupon<br>approver: Can the user approve/reject the coupon<br>viewer: Can the user view the coupon | |

DB Interface
When a tool user logins in, the database may be queried using the user's sns name to create a java object. The object contains a TooUser object with user's info in tool_user table. It also contains a list of CpgToolUser objects for all the entries in cpg_tool_user table. The following method may be used to check if the user has the privilege to perform an action:

boolean privilegeCheck(int cpgId, int couponStateId, int actionId). Where cpgId and couponStateId are two attributes in the coupon table and we have the following list of action ids.

TABLE 5

| Action Id | Description |
| --- | --- |
| 1 | Create or edit the coupon |
| 2 | Change coupon state |
| 3 | Approve or reject a coupon |
| 4 | View Coupon |

Although process 300 and 400 describes a particular implementation for inserting and editing coupons, other implementations are possible. For example, in one implementation, manufacturers may be able to add, edit and/or upload coupons directly without the use of an insertion administrator. In another implementation, approval need not be implemented as a separate process.

Furthermore, the insertion process may implement rules that enforce certain restrictions, such as manufacture exclusivity. For example, Coca-Cola may not want its coupons made available at the same time as coupons for Pepsi. Certain rules may be implemented to prevent such occurrences.

In yet another implementation, the application system 101 may add general coupons that may be accepted for goods of any manufacturer. In this implementation, a particular manufacturer need not be selected and the coupon need not apply to specific goods. For example, the generic coupon may be added to a user's account to satisfy a complaint from the user. In this case, the value of the coupon may be paid by the company providing the application system.

Figure 5:
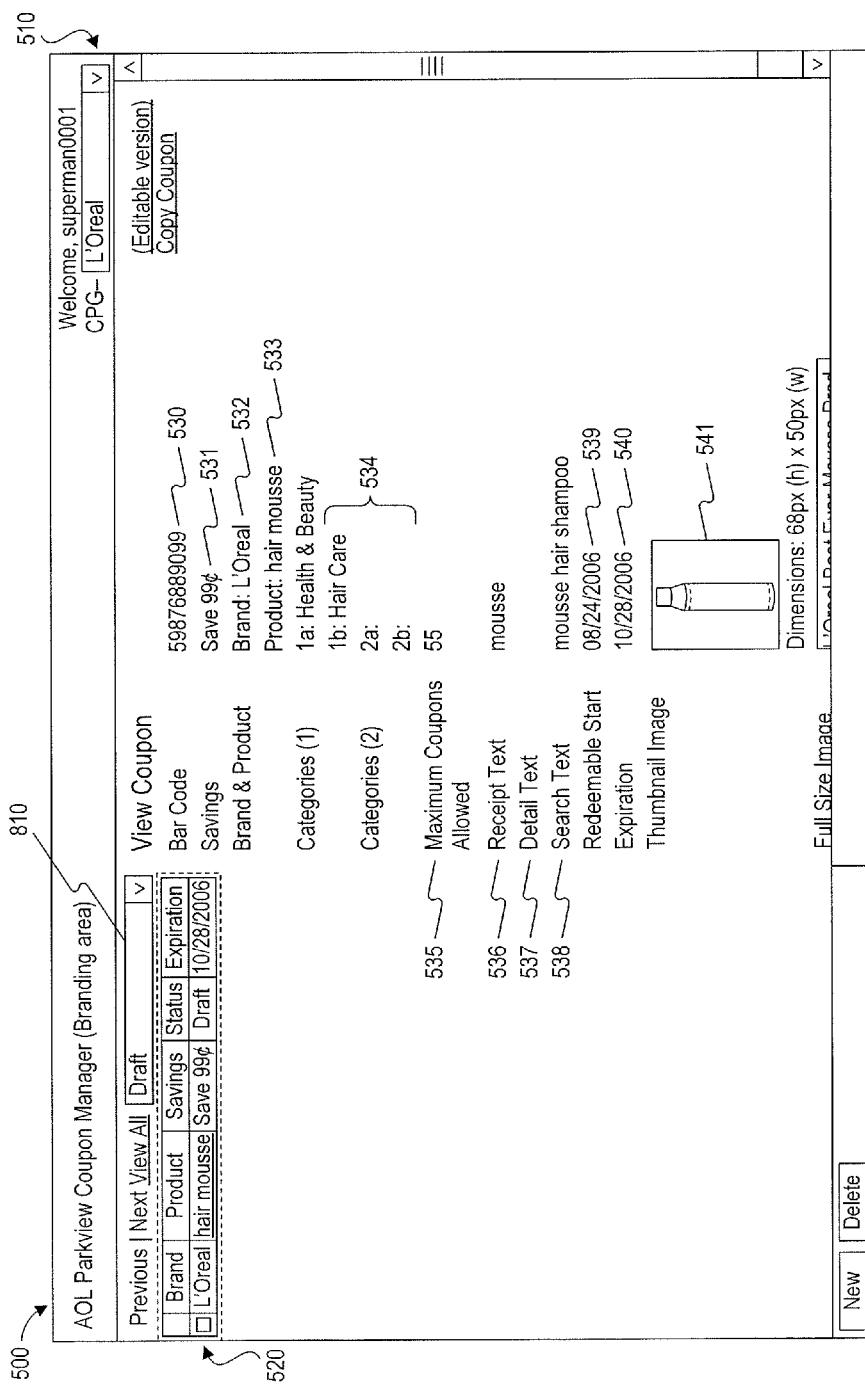
Figure 6:
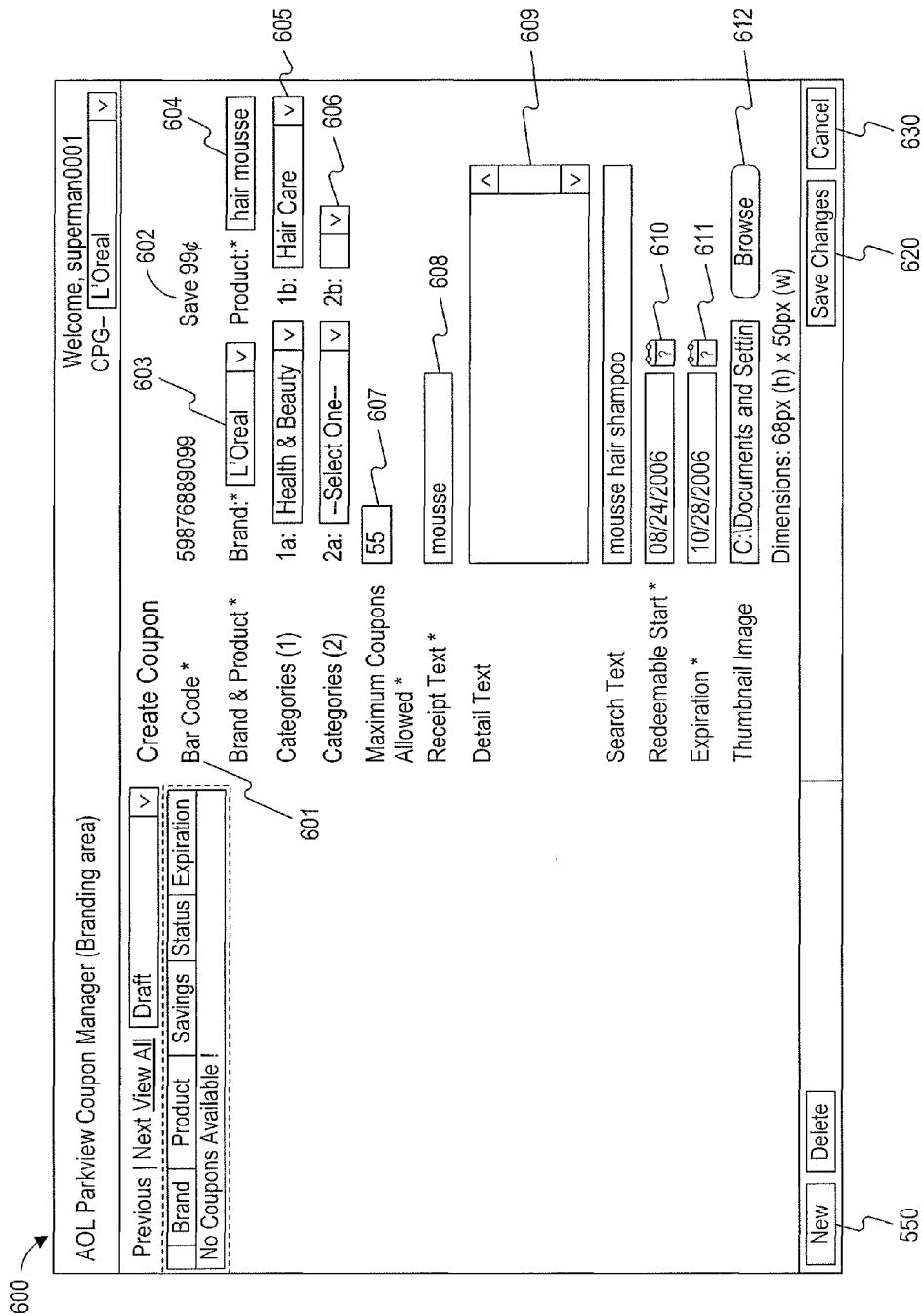
Figure 7:
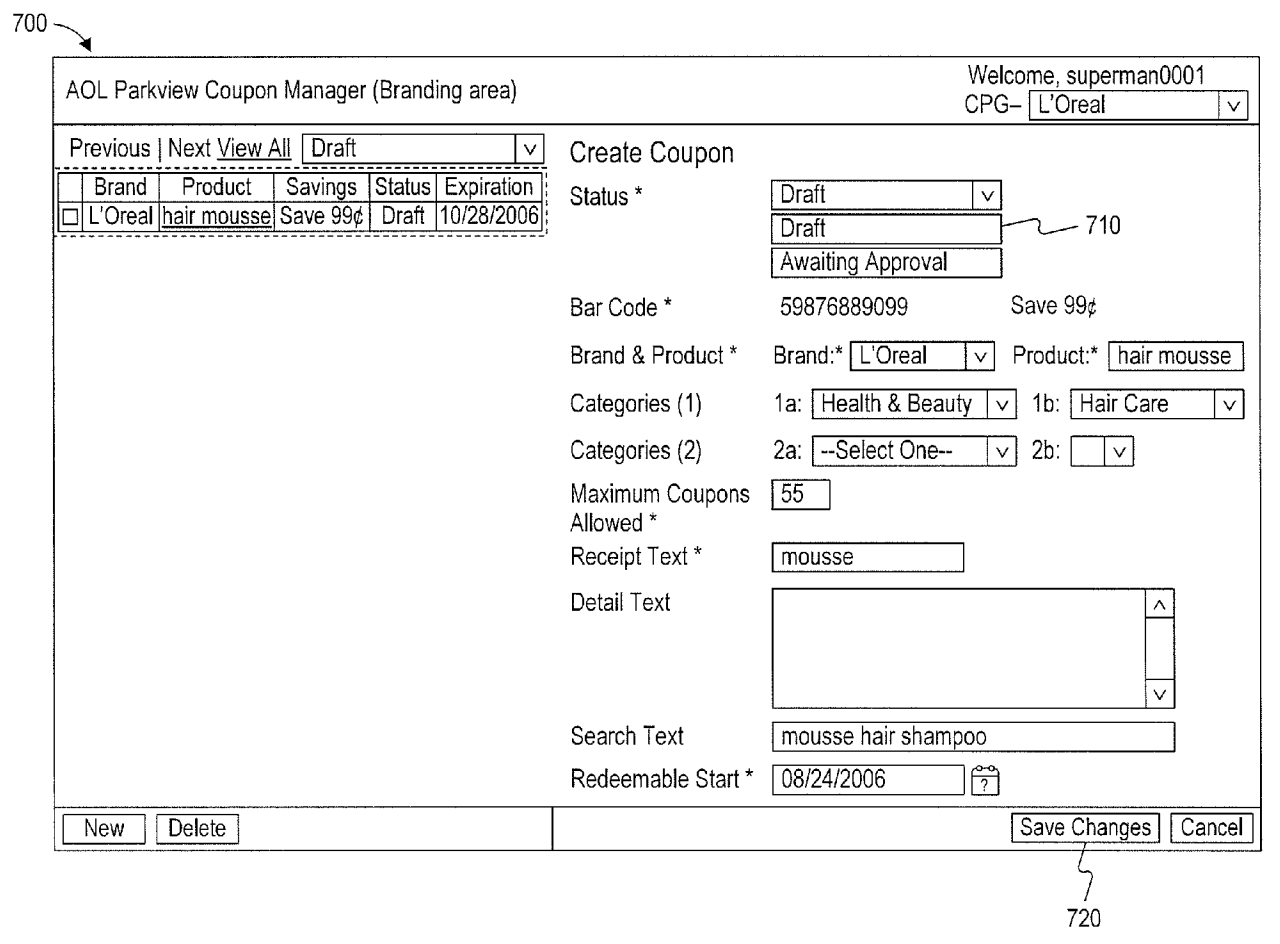

FIGS. 5-7 illustrate exemplary user interfaces that an application system may use in performing process 300, FIG 5 illustrates an example of a user interface 500 that may be presented to an insertion administrator to allow the addition or editing of a coupon. The user interface 500 includes a drop-down menu 510 configured to allow a user to select a manufacturer (350). When a user selects a particular manufacturer, the user interface 500 displays a list of coupons 520 in draft form corresponding to the selected manufacturer. The user interface 500 displays details of a coupon included in the list that the user has selected to view or that the application system has selected by default. The details of the coupon include a bar code 530 associated with the coupon, a savings value 531 of the coupon, a brand 532 associated with the coupon, and a product 533 associated with the coupon. The details may also include a set of categories 534 with which the coupon belongs. The categories indicate that the coupon will be displayed when a user chooses to view coupons in a specified category. The set of categories may include a first set of categories and a second set of categories, the second set of categories indicating categories in which the coupon is less relevant than the first set of categories. Coupons having a specific category in the first set of categories may be treated differently than coupons having the specific category in the second set of categories. For example, coupons having a specific category listed in the first set of categories may be displayed before coupons having the specific category listed in the second set of categories.

The details of the coupon displayed in user interface 500 also include a number of maximum coupons allowed 535. The maximum coupons allowed 535 indicate the number of consumers who may select the coupon before the application system removes the coupon from the list of available coupons. For example, if the maximum coupons allowed field is set to 55, the application system removes the coupon after 55 users have selected the coupon to associate with their account, thereby preventing subsequent users from selecting the coupon.

The details of the coupon displayed in user interface 500 include receipt text 536, detail text 537, and search text 538. The receipt text 536 is the text that a retailer system prints on the receipt of a user in addition to the value saved when a coupon is redeemed. The printed receipt text 536 allows the user to identify the coupon that has been automatically redeemed. The detail text 537 provides details of the coupon. For example, the detail text may include terms and conditions associated with the coupon. The search text 538 is text used to identify the coupon when a user searches for coupons using the application system. For example, if the user searches for a term included in the search text, the coupon will be displayed to the user in the search results.

The details of the coupon displayed in user interface 500 further include a redeemable start date 539, an expiration date 540, and a thumbnail image 541. The redeemable start date 539 indicates the date that the coupon is made available to users of the application system. The expiration date 540 indicates the date that the coupon will no longer be available to and/or redeemable by users of the application system. The thumbnail image 541 is an image displayed to users when they are viewing coupons on the application system.

The user interface 500 also includes user actionable items 550, 560, and 570. User actionable item 550 allows an insertion administrator to create a new coupon for the selected manufacturer (360), user actionable item 560 allows an insertion administrator to delete an existing draft coupon for the selected manufacturer, and user actionable item 570 allows an insertion administrator to access an editable version of the coupon being viewed (360). User actionable items 550, 560, and 570 may be buttons, links, or any other interface items that a user may activate using an input device of an electronic system, such as a mouse, keyboard, trackball, stylet, touch screen, or microphone.

FIG. 6 illustrates an example of a user interface 600 that may be presented when user actionable item 550 is selected to create a coupon. The user interface 600 includes interface items an insertion administrator may use to enter coupon details. For example, user interface 600 includes a bar code text box 601 with which a user may enter a bar code for the coupon. The user interface 600 also includes a savings value field 602. As shown, the sayings value field 602 has been preset by the manufacturer and cannot be modified by the user. In another implementation, the savings value field 602 may be configured to allow a user to edit a preset value set by the manufacturer or allow, the user to add a savings value. The user interface 600 further includes a brand drop-down menu 603, a product text box 604, drop-down menus 605 for specifying a first set of categories, and drop-down menus 606 for specifying a second set of categories. The user interface 600 includes a maximum coupons allowed text box 607, a receipt text box 608, a detail text box 609, and a search text box 610. The user interface 600 further includes a redeemable start text box 611 and an expiration date text box 612. The redeemable start text box 611 and the expiration date text box 612 may each have a calendar actionable item associated with the text box that a user may use to select a date from calendar. The user interface 600 also includes a thumbnail image text box 613 that a user may use to specify a path name of a file including a thumbnail image the user wishes to be associated with the coupon. The thumbnail image text box 613 has a browse button associated with the text box that a user may use to navigate a directory structure and select a file including a thumbnail image.

After entering the detail information for the coupon, a user may select actionable item 620 to save changes to the coupon in draft form. If a user decides not to add the coupon, the user may select actionable item 630 to cancel creation of the coupon.

Although specific interface elements have been described with respect to user interface 600, other interface elements may be used. For example, a text box may be replaced with a drop-down menu or a drop-down menu may be replaced by checkboxes or radio buttons.

FIG. 7 illustrates an example of a user interface 700 configured to allow a user to change the status of a coupon. The user interface 700 includes a status drop-down menu 710 that a user may use to change the status of a draft coupon to awaiting approval (380). The user interface 700 also includes a user actionable item 720 to save changes made to the coupon, including changes made to the status of the coupon. After the user changes the status of the coupon to awaiting approval, the coupon may be reviewed by a user in process 400.

Figure 10:
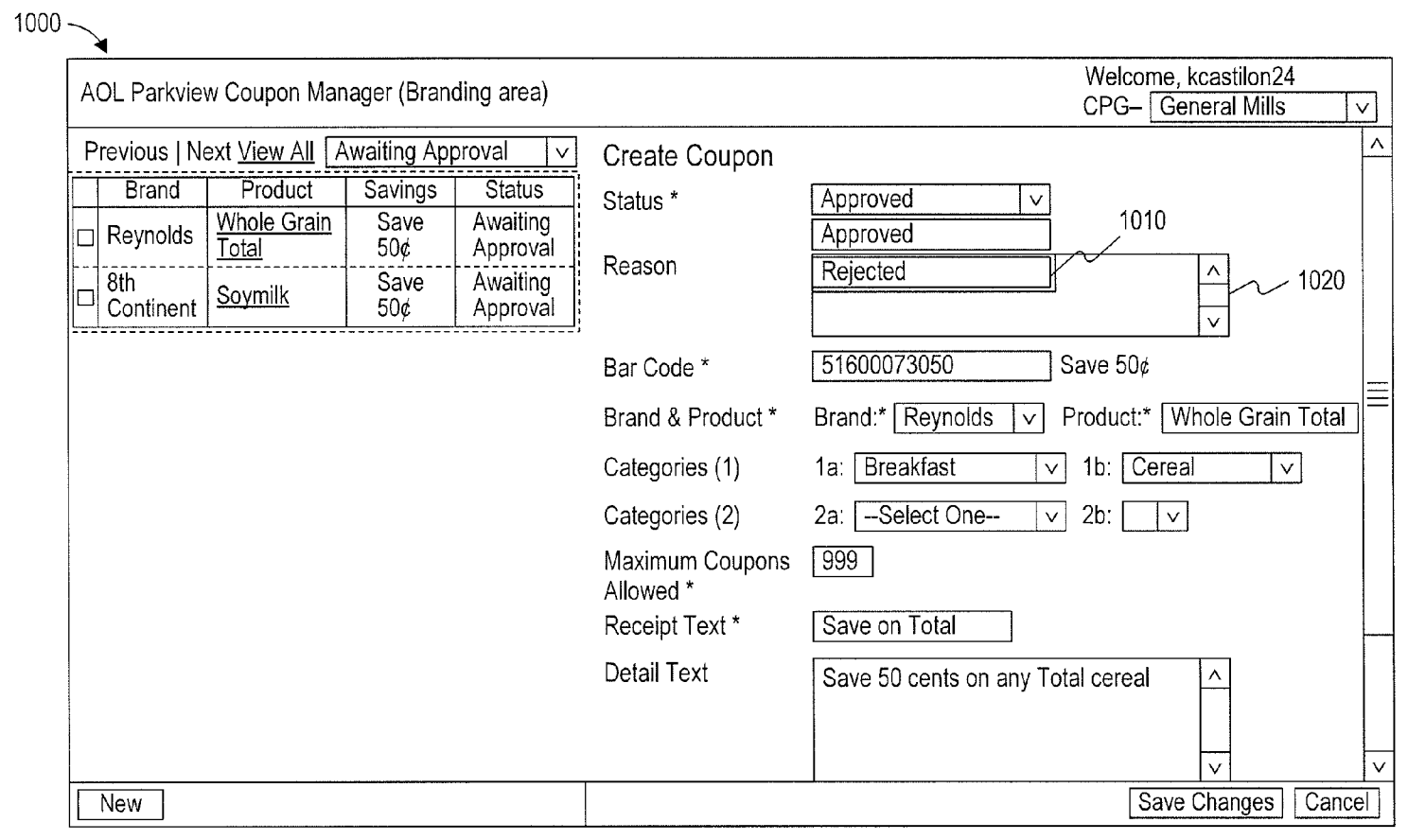

FIGS. 8-10 illustrate examples of user interfaces that an application system may present during process 400.

FIG. 8 illustrates an example of a user interface 800 presented to a manufacturer or advertisement agency user when the user logs into the application system (410). User interface 800 includes a drop-down menu 810 that the user may use to select to view coupons awaiting approval (420). When a user selects to view coupons awaiting approval, user interface 800 displays a list of coupons 830 having the status of awaiting approval. The user interface 800 also includes a user actionable item 820 that a user may activate to display an editable version of a coupon awaiting approval.

FIG. 9 illustrates an example of a user interface 900 configured to allow a user to approve a coupon awaiting approval. User interface 900 includes a drop-down menu 910 that a user may use to change the status of the coupon to approved (450). After a user has approved a coupon, the application system stores the coupon in a database of the application system and makes the coupon available to users of the electronic coupon management system.

FIG. 10 illustrates an example of a user interface 1000 configured to allow a user to reject a coupon awaiting approval. User interface 1000 includes a dropdown menu 1010 that a user may use to change the status of the coupon to rejected and a text box 1020 that a user may use to enter reasons that the coupon has been rejected (440). After a user has rejected a coupon, the application system may return the coupon to draft form such that a user may edit the coupon according to the reasons the coupon has been rejected.

Figure 11:
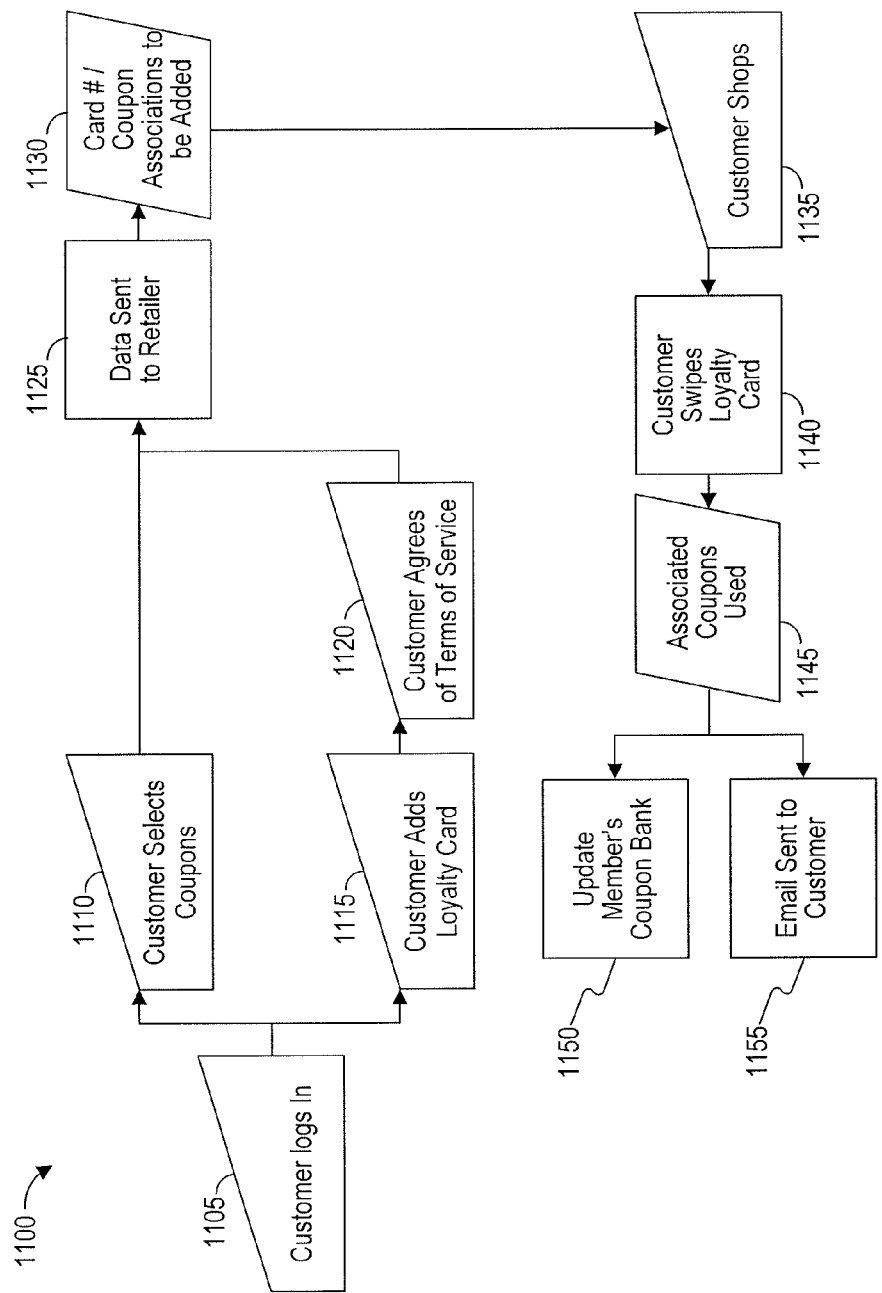
FIG. 11 is a flow diagram illustrating an example of a process involving a customer interacting with an electronic coupon management system.

FIG. 11 is a flow diagram 1100 illustrating an example of a process 1100 involving a customer interacting with an electronic coupon, management system (e.g., electronic coupon management system 100). A customer logs in to the electronic coupon management system (1105). For example, in the implementation described with respect to FIG. 1, a customer may log into application system 101 using authentication server farm 111. After logging in, a customer may select coupons the customer would like to associate with the customer's account (1110). For example, in the implementation described with respect to FIG. 1, the user may interact with a user interface provided by web server farm 112 and select electronic coupons displayed on the user interface. In one implementation, the user may only select coupons if the user has associated at least one loyalty card with his or her account.

The user may also add a loyalty card to his or her account (1115). To complete addition of a loyalty card to his or her account, the customer agrees to the terms of service of the electronic coupon management system (1120).

After the customer selects coupons (1110) or successfully adds a loyalty card (1115 and 1120), the data is sent to one or more retailers (1125). For example, in the implementation described with respect to FIG. 1, a customer may interact with web server farm 112 to select coupons or add a loyalty card. After the customer selects a coupon or adds a loyalty card, the web server farm 112 updates the information in database 121. Application support server 113 then sends a message with data reflecting the actions taken by the user to messaging hub 130. Messaging hub 130 forwards, the information to the retailer systems 140. In implementations in which the customer selects coupons (1110), the data sent to the retailer may include information identifying the user and identifying the coupons the customer has selected. In implementations in which the customer successfully adds a loyalty card (1115 and 1120), the data sent to the retailer may include information indicating that the user has added the loyalty card and information identifying the coupons the customer has previously added to the customer's account. In these implementations, the customer may redeem coupons added to the customer's account prior to the addition of the loyalty card at a retailer associated with the added loyalty card. The information identifying the coupons may include only coupon identifiers and a loyalty server associated with the added loyalty card may have already stored terms of the coupons prior to the customer adding the loyalty card.

After the one or more retailers receive the data, the systems of the one or more retailers associate the coupons added by the customer with the loyalty card of the customer (1130). For example, in the implementation described with respect to FIG. 1, the loyalty servers 141, 142, and 143 may receive the data from the messaging hub and associate the coupons selected with the loyalty card corresponding to the customer. As discussed above, in implementations in which the customer successfully adds a loyalty card (1115 and 1120), the coupon associations may include coupons the customer has previously added to the customer's account because the customer has not presently selected a new coupon.

After the customer has associated coupons with loyalty cards associated with his or her account, the customer shops (1135). The customer selects goods at a retail store and proceeds to check out. During checkout, the customer swipes a loyalty card (1140) and coupons are used that are associated with the loyalty card and correspond to goods the user is purchasing (1145). For example, in the implementation described with respect to FIG. 1, the point of sale retailer system 144, 145, or 146 receives the swipe of the customer's loyalty card, provides the information to the corresponding loyalty server 141, 142, or 143, and the point of sale retailer system 144, 145, or 146 and the corresponding loyalty server 141, 142, or 143 cooperate to automatically redeem the coupons associated with the customer's loyalty card that correspond to goods the user is purchasing. For instance, in some implementations, coupon data is downloaded to the point of sale system 144, 145, or 146, the point of sale system matches coupons to goods being purchased, and the appropriate amount is subtotaled from the user's total bill.

After the customer has redeemed coupons, the customer's coupon information is updated (1150) and an email providing coupon information is sent, to the customer (1155). For example, in the implementation described with respect to FIG. 1, the loyalty server 141, 142, or 143 sends a message to messaging hub 130 identifying coupons the customer has redeemed. The messaging hub 130 forwards the message to the application support server farm 113 and the other loyalty servers 141, 142, and 143. The application support server farm 113 and the other loyalty servers 141, 142, and 143 update the coupon information associated with the customer. In addition, application system 101 may send an email to the customer providing coupon information associated with the customer. For instance, the coupon information may indicate the coupons that the customer redeemed, the amount the customer saved, and information related to the coupons that remain associated with the customer's account.

FIGS. 12-20 illustrate examples of user interfaces that an electronic coupon management system may use in performing process 1100.

Figure 12:
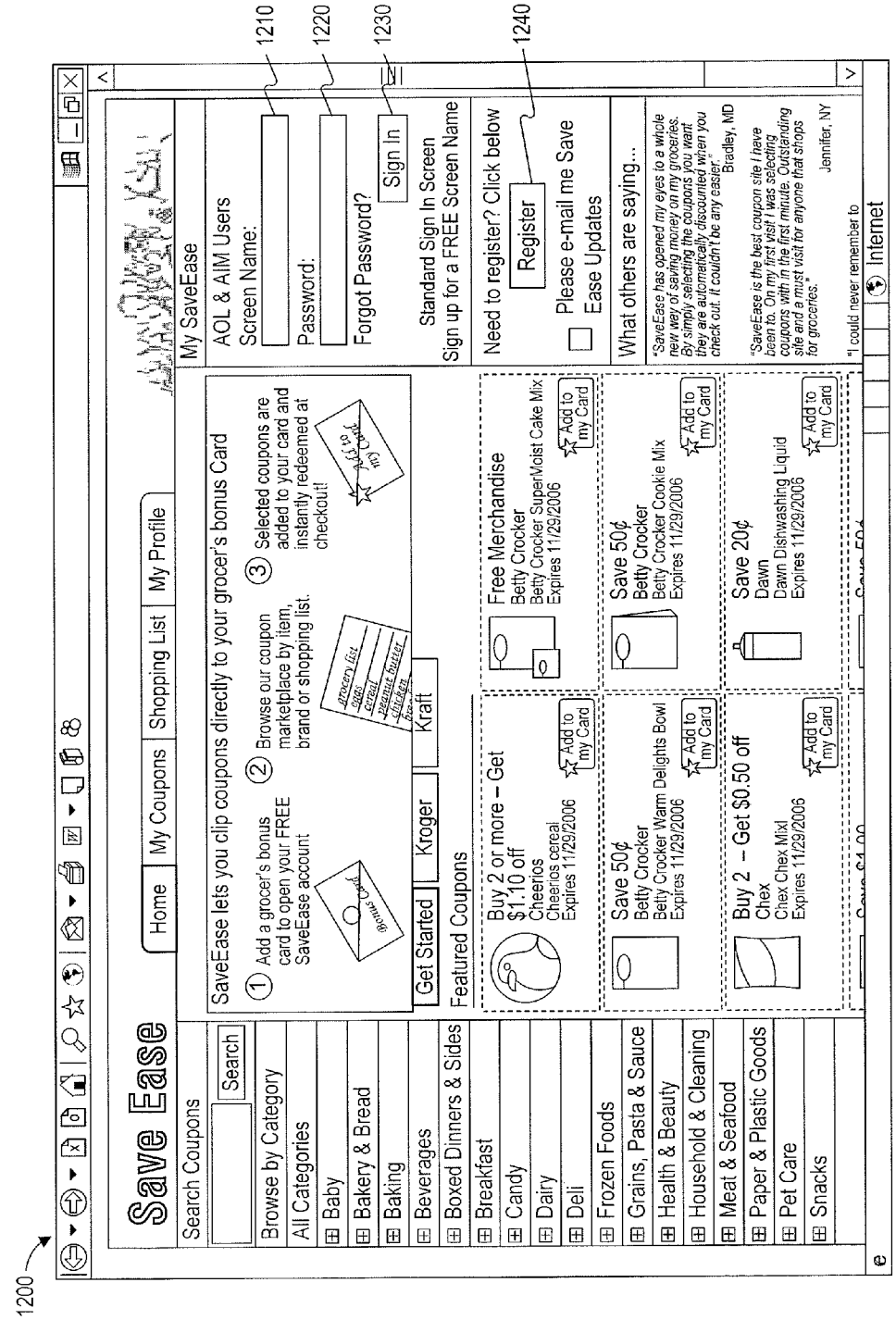

FIG. 12 illustrates an example of a user interface 1200 that may be presented to a customer to allow the customer to log into the electronic coupon management system (1105). User interface 1200 includes a screen name text box 1210, a password text box 1220, and a user interface actionable item 1230 that a user may activate to sign in to the electronic coupon management system. When a user activates the user interface actionable item 1230, the screen name entered in screen name text box 1210 is compared to stored screen names and, if a match is found, the password entered in the password text box 1220 is compared to the stored password corresponding to the screen name. If the passwords match, the customer is authenticated and logged in. If the screen name is not found or the passwords do not match, the customer is not authenticated and not logged in. The user interface 1200 also includes a user interface actionable item 1240 that a user may use to register an account.

Figure 13:
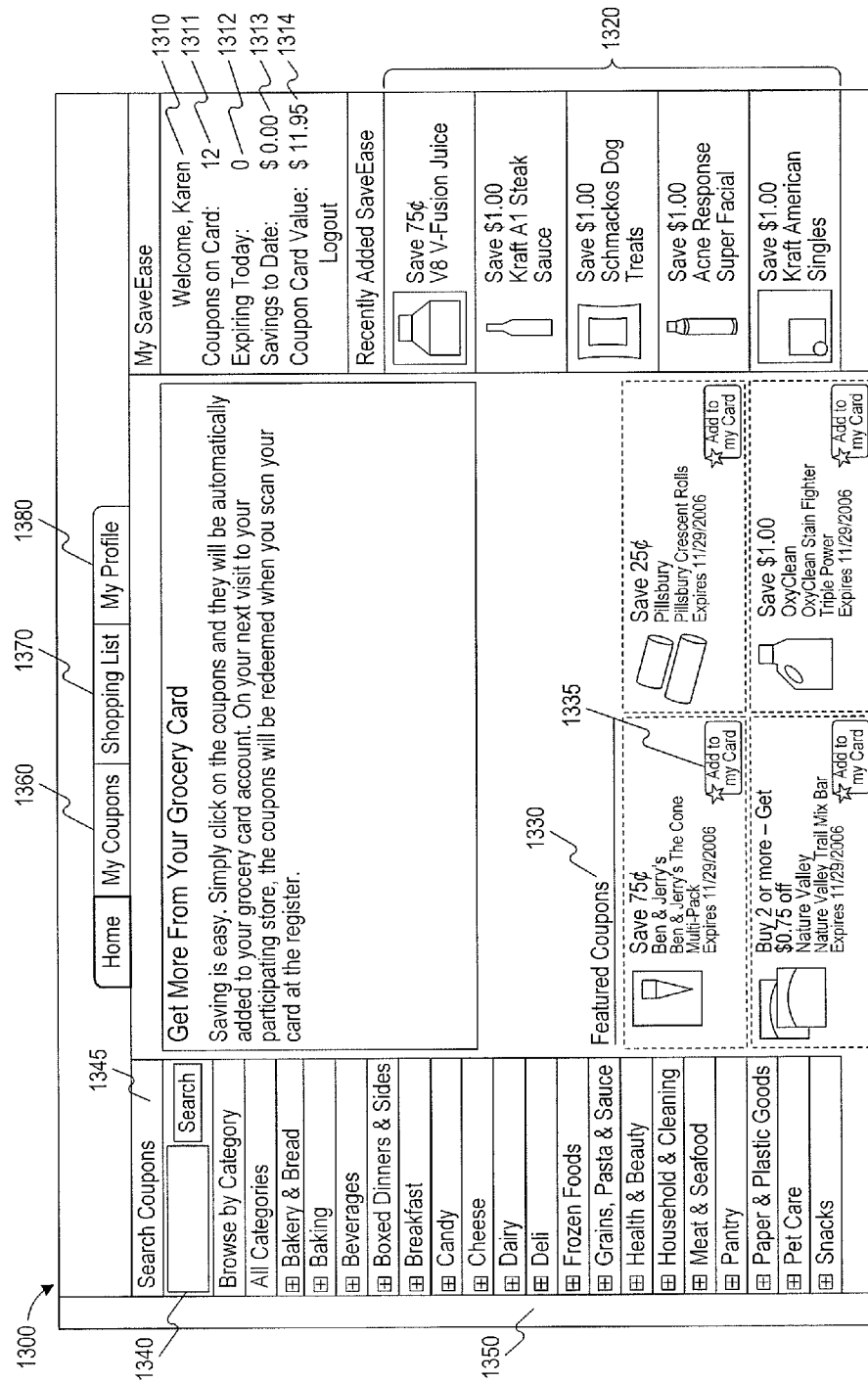

FIG. 13 illustrates an example of a user interface 1300 that may be presented to a customer when the customer logs into the electronic coupon management system (1105). The user interface 1300 displays coupon information associated with the customer when the customer logs in. For example, user interface 1300 displays a name of the customer 1310, the number of coupons associated with the customer's loyalty cards 1311, the number of coupons that are expiring today 1312, the customer's savings to date 1313, and the value of the coupons associated with the customer's loyalty cards 1314. The user interface 1300 also includes a list of coupons recently added by the customer 1320 and a featured coupons section 1330 displaying coupons that the customer may add to the customer's loyalty cards. In one implementation, the featured coupons section 1330 displays coupons of manufacturers that have paid to have coupons listed in the featured coupons section. In another implementation, the featured coupons section 1330 may include coupons that are similar to coupons that the customer has recently added or for which the customer has indicated a preference. Each coupon displayed has a corresponding user interface actionable item 1335 that allows a customer to add the coupon to his or her loyalty cards. When a user activates user actionable item 1335 the corresponding coupon is added to the customer's loyalty cards and the coupon information associated with the customer is updated.

The user interface 1300 also includes a search text box 1340 and a user interface actionable item 1345 that allows a customer to perform a search for coupons using the text entered in the search text box 1340. The user interface 1300 includes a category list 1350 that allows a user to browse coupons by category. Further, the user interface 1300 includes tabs 1360, 1370, and 1380. When the customer selects tab 1360 a user interface displaying coupon information associated With the customer is displayed, when the customer selects tab 1370 a user interface configured to allow the customer to create or edit a shopping list is displayed, and when the customer selects tab 1380 a user interface configured to allow the customer to edit the customer's profile data is displayed.

Figure 14:

FIG. 14 illustrates an example of a user interlace 1400 configured to allow a customer to add a loyalty card to his or her account (1115). In one implementation, user interface 1400 is displayed when a customer activates user actionable item 1335 to add a coupon when the customer does not have a loyalty card associated with his or her account. In another implementation, user interface 1400 is displayed when a customer activates a user actionable item indicating a desire to add a loyalty card.

The user interface 1400 includes an add loyalty card section 1410. The add loyalty card section 1410 includes a select store drop-down menu 1411, a card number text box 1412, a re-enter card, number text box 1413, and a user interface actionable item 1414. The select store drop-down menu 1411 allows a customer to select the store associated with the loyalty card to be added. The text boxes 1412 and 1413 allow a customer to enter and re-enter the card number associated with the loyalty card to be added. When a customer activates the user actionable item 1414, the card number entered in text box 1412 is compared to the card number, entered in text box 1413 and, if the numbers match, the loyalty card for the specified store with the specified card number is added to the customer's account. Information indicating the addition of the card may be sent to the retailer system corresponding to the store associated with the loyalty card. Information indicating coupons previously associated with the customer's account may also be sent to the retailer system corresponding to the store associated with the loyalty card.

Figure 15:
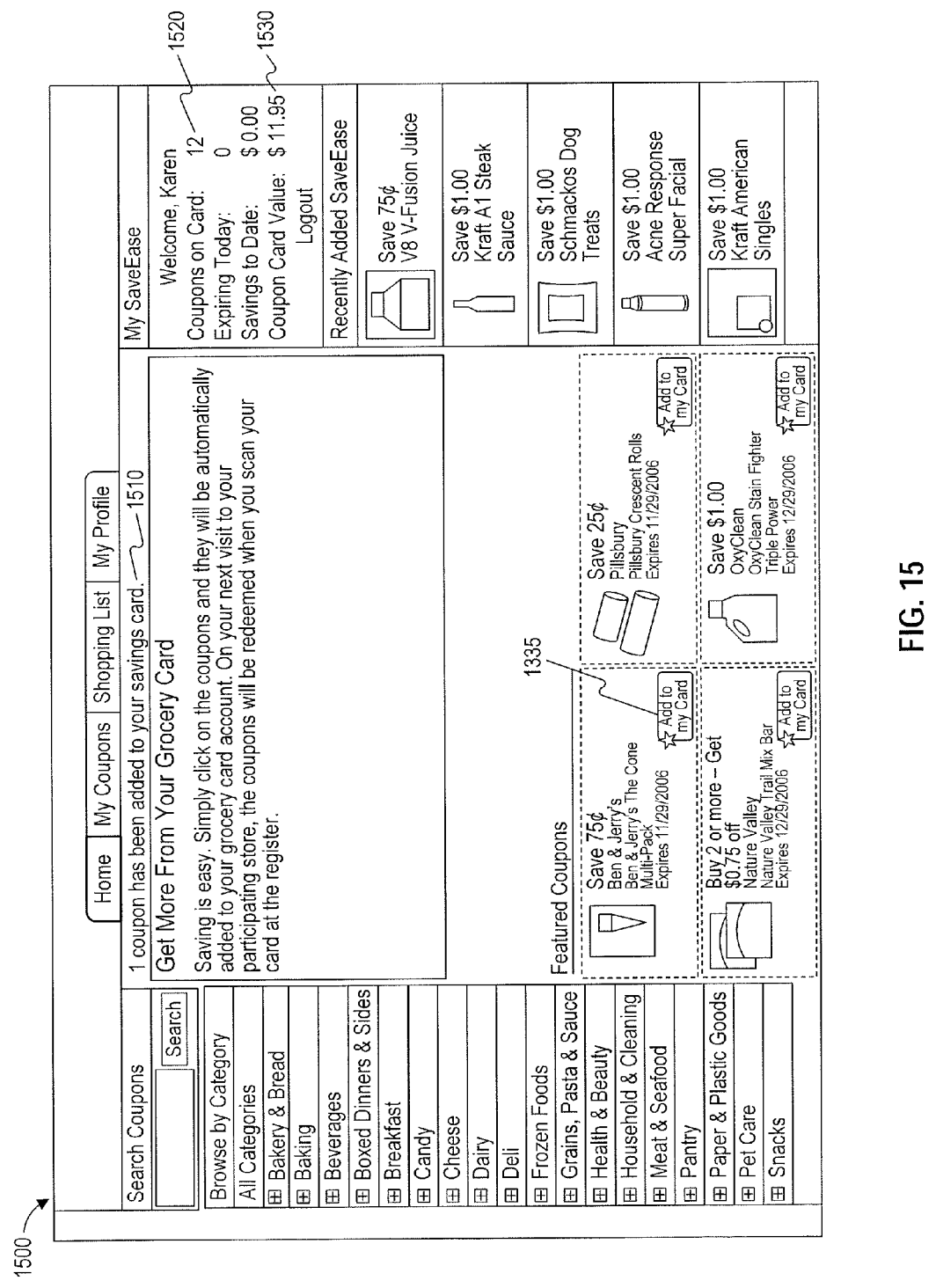

FIG. 15 illustrates an example of a user interface 1500 presented to a customer when a customer selects a coupon to add to the customer's loyalty cards (1110). For example, user interface 1500 may be displayed when a customer activates user interface actionable item 1335. User interface 1500 includes message 1510 that indicates that a coupon has been added to the customer's loyalty card. The user interface 1500 also includes updated information related to the number of coupons associated with the customer's loyalty cards 1520 and updated information related to the value of coupons associated with the customer's loyalty cards 1530. For example, if a customer selects user interface actionable item 1335 after adding a loyalty card with user interface 1400, user interface 1500 would be displayed. In user interface 1500 as compared to user interface 1400, the number of coupons associated with the customer's loyalty cards 1520 has increased to 12 from 11 and the value of coupons associated with the customer's loyalty cards 1530 has increased by $0.75 to $11.95 from $11.20.

In one implementation, the updates to user interface 1500 may be rendered in response to the user interacting with user interface 1400 without receiving a specific confirmation that the electronic coupon has been added to the user's account by the electronic coupon management system. For example, the user interface 1500 may be a result of a dynamically redrawn web page. In this example, the user interface 1500 may have been dynamically redrawn using dynamic hypertext markup language (DHTML) or Asynchronous JavaScript and XML (AJAX) to indicate the coupon has been selected by, for instance, removing the coupon from the selection page shown to the user. Instead of the electronic coupon management system sending back a specific confirmation that the coupon has been added, the electronic coupon management system may instead simply send back an acknowledgement that the message was received, or give a reason why addition of the coupon went wrong. If addition of the coupon went wrong, the webpage may be dynamically redrawn to inform the user the coupon selection did not occur properly. If no acknowledgement is received in a certain time period, the webpage may be refreshed to synchronize the displayed information with the data at the electronic coupon management system.

Figure 16:
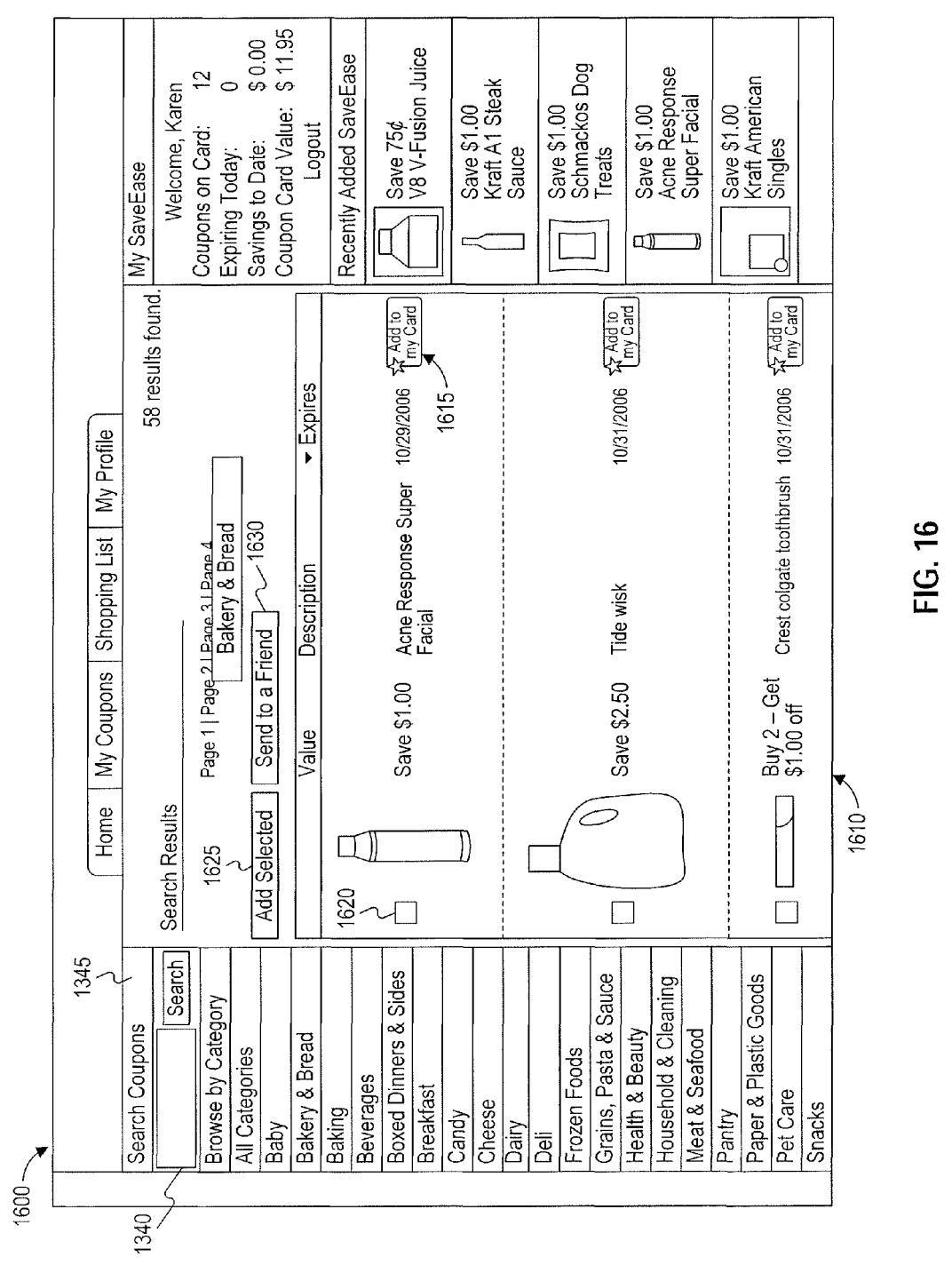

FIG. 16 illustrates an example of a user interface 1600 presented to a customer when a customer searches for coupons using search text box 1340 and user interface actionable item 1345. User interface 1600 includes a list of coupons 1610 representing search results. Each coupon displayed in the list of coupons includes a user interface actionable item 1615 configured to associate the corresponding coupon to the customer's account when the customer activates the user actionable item 1615. Each coupon displayed in the list of coupons also includes a check box 1620 that a user can check to identify a desired coupon. The user interface 1600 further includes user interface actionable items 1625 and 1630. When a customer activates user interface actionable item 1625, one or more coupons for which the customer has identified using the corresponding check box 1620 are associated with the customer's loyalty cards. When a customer, activates user interface actionable item 1630, one or more coupons for which the customer has identified using the corresponding check box 1620 are sent to a friend identified by the customer.

Figure 17:
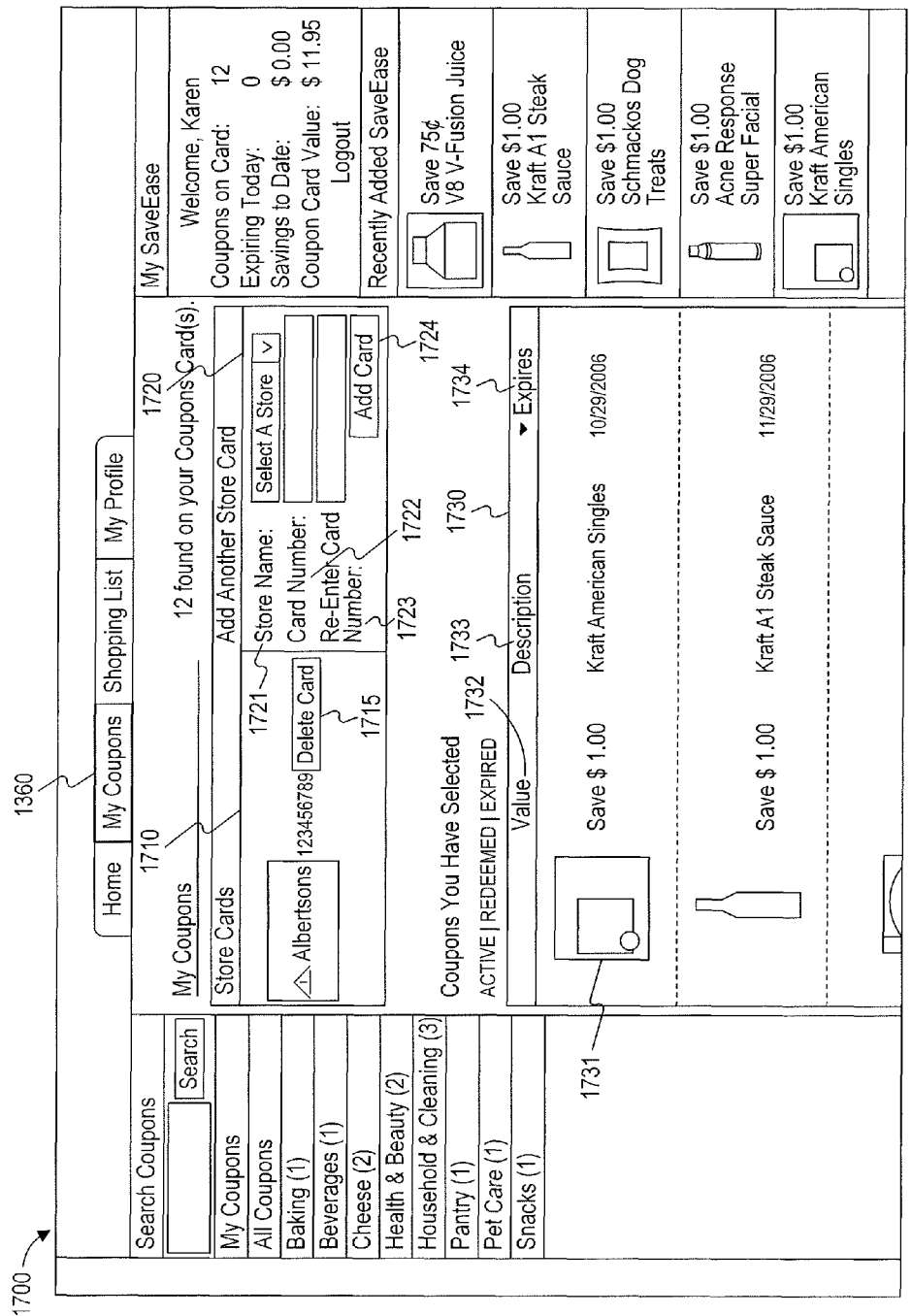

FIG. 17 illustrates an example of a user interface 1700 displayed when a customer activates the My Coupons tab 1360. User interface 1700 includes an associated loyalty cards section 1710, an add a loyalty card section 1720, and an associated coupons section 1730. The associated loyalty cards section 1710 displays a list of loyalty cards associated with the customer's account. Each loyalty card displayed in the list includes a user interface actionable item 1715 that allows a user to delete the corresponding loyalty card. The add a loyalty card section 1720 includes a select store drop-down menu 1721, a card number text box 1722, a re-enter card number text box 1723, and a user interface actionable item 1724 that allows a customer to add a loyalty card. When a customer activates the user interface actionable item 1724, the card number entered in the card number text box 1722 is compared to the card number entered in re-enter card number text box 1723 and the loyalty card is added to the customer's account if the numbers match. The associated coupons section 1730 includes a list of coupons associated with the customer's loyalty cards. The coupons are displayed with a thumbnail image 1731, a value 1732, a description 1733, and an expiration date 1734.

Figure 18:
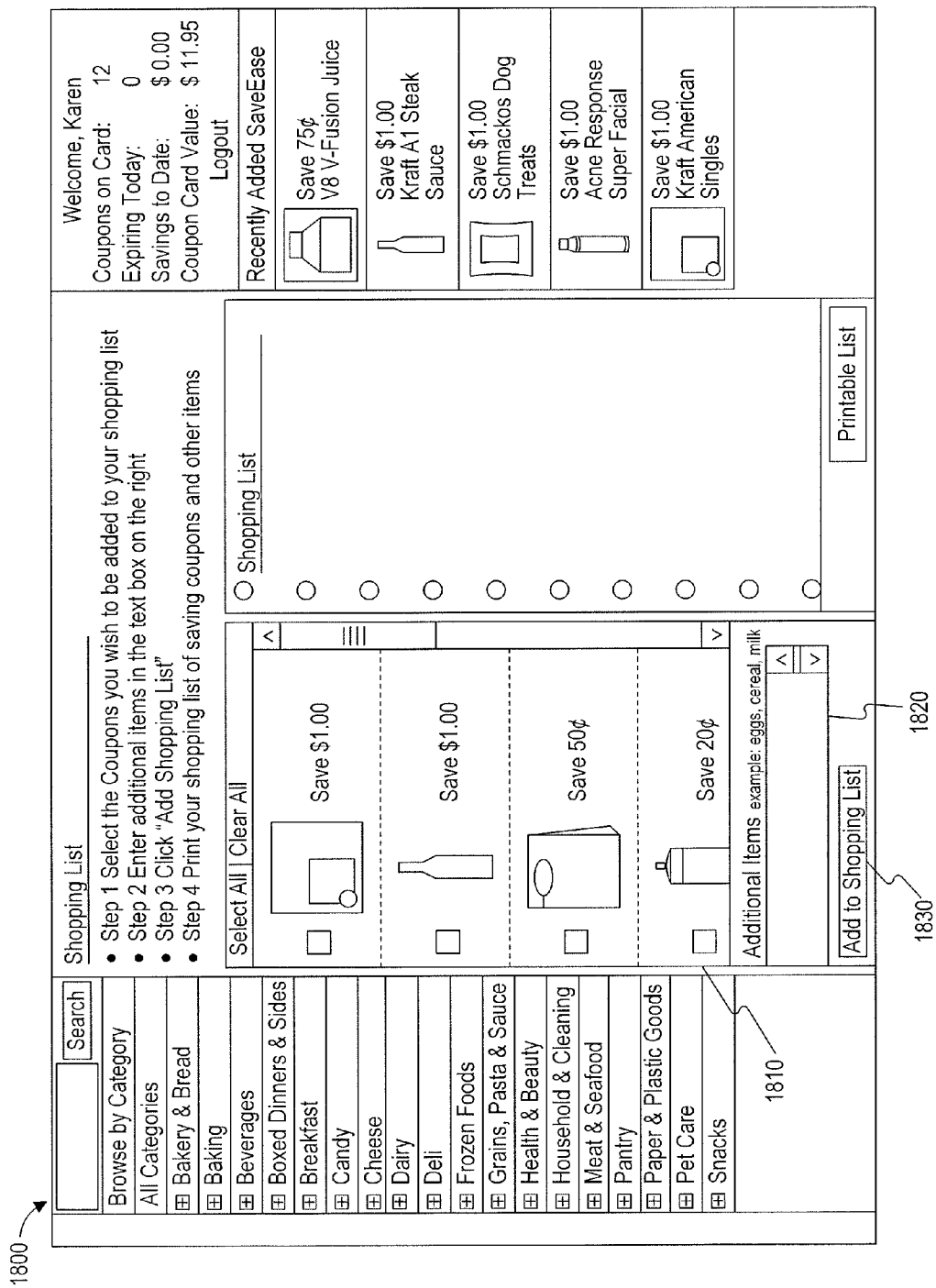

FIG. 18 illustrates an example of a user interface 1800 displayed when a customer activates the Shopping List tab 1370 displayed in FIG. 13. The user interface 1800 includes a list of coupons associated with the customer's loyalty cards 1810. Each coupon in the list includes a checkbox with which the customer can identify the coupon. User interface 1800 also includes an additional items text box 1820 configured to allow a customer to include additional items in the shopping list. For example, the additional items may be items for which the customer does not have a coupon. User interface 1800 further includes a user interface actionable item 1830 configured to add items to the shopping list. When a customer activates user interface actionable item 1830 the coupons in the list 1810 identified by having a corresponding check box checked and the additional items entered in the additional items text box 1820 are added to the shopping list.

Figure 19:

FIG. 19 illustrates an example of a user interface 1900 displaying a shopping list associated with a customer. User interface 1900 includes a list portion 1910 displaying items included in the shopping list. User interface 1900 also includes a user interface actionable item 1920 that allows a user to generate a printable form of the shopping list when activated.

Figure 20:
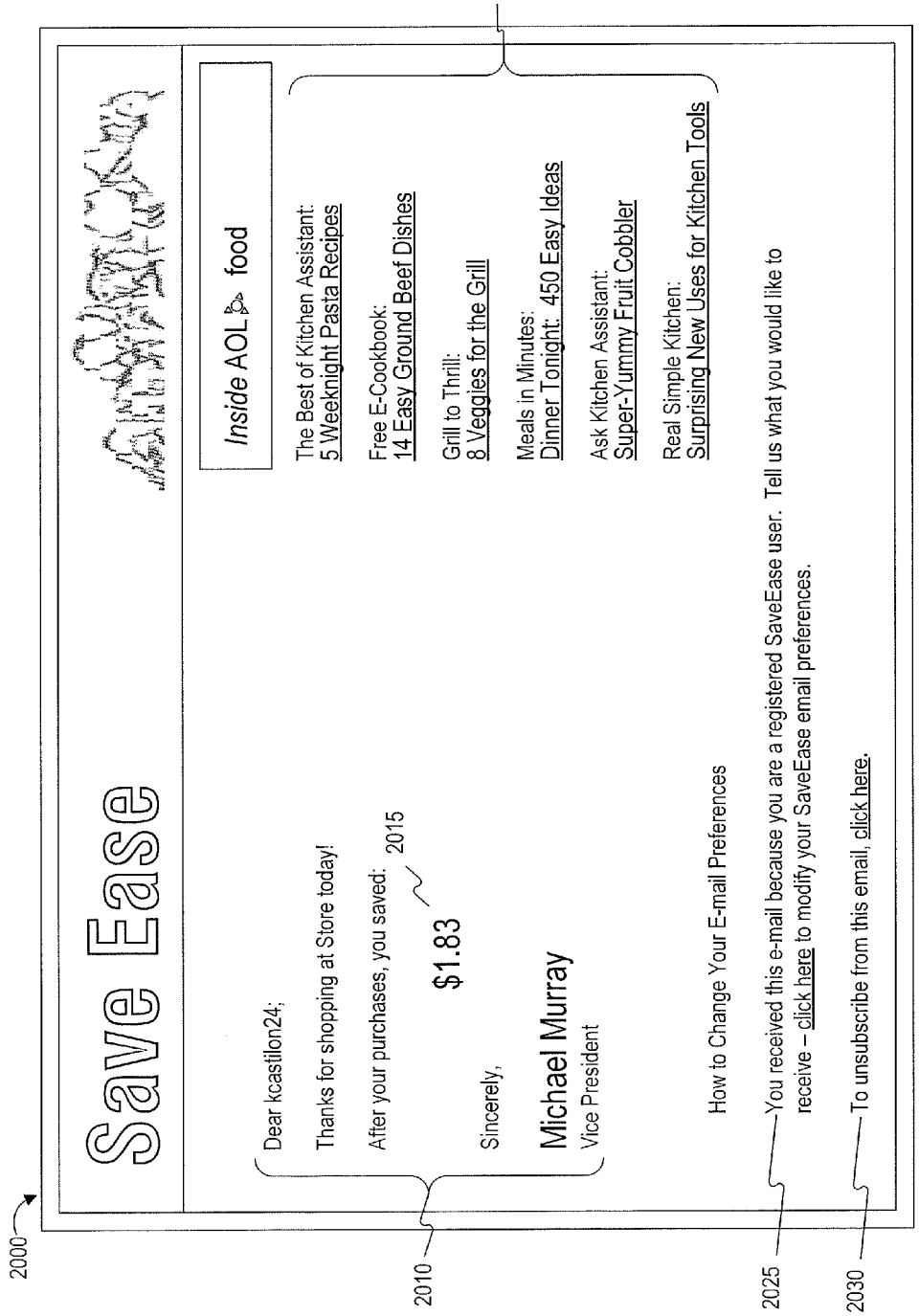

FIG. 20 illustrates an example of an email 2000 sent to a customer after the customer has redeemed coupons associated with the customer's loyalty card (1155). The email 2000 includes a message portion 2010 providing information regarding coupons redeemed by the customer. The message portion 2010 includes an amount saved portion 2015 that indicates the amount the customer saved by redeeming the coupons. Email 2000 further includes content area 2020. Content area 2020 provides a list of content that the customer may be interested based on the goods the customer purchased and the coupons the customer redeemed. The content area 2020 may provide the user with targeted advertisements or with articles that may be of interest to the customer. The email 2009 further includes a portion 2025 that allows a user to change email preferences and a portion 2030 that allows the user to unsubscribe from emails sent from the electronic coupon management system.

In one implementation, the information provided to the customer in email 2000 may be presented to the customer on a webpage associated with the customer's account. In another implementation, a user may be sent the information provided in email 2000 through, another communication media. For example, the information may be provided in an instant message, a text message, a voice message, a video message, or another type of message capable of providing the information.

In another implementation, a customer may receive other types of alerts. For example, a customer may receive alerts indicating that a particular coupon is expiring or that a new coupon is available to be associated with the user's loyalty card. The alerts may selectively be sent to the customer based on the customers preferences. The alerts may be sent to the customer in the form of an email message, an instant message, a pager alert, a text message, a voice message, a video message, or another type of message capable of providing the alert.

Figure 21:
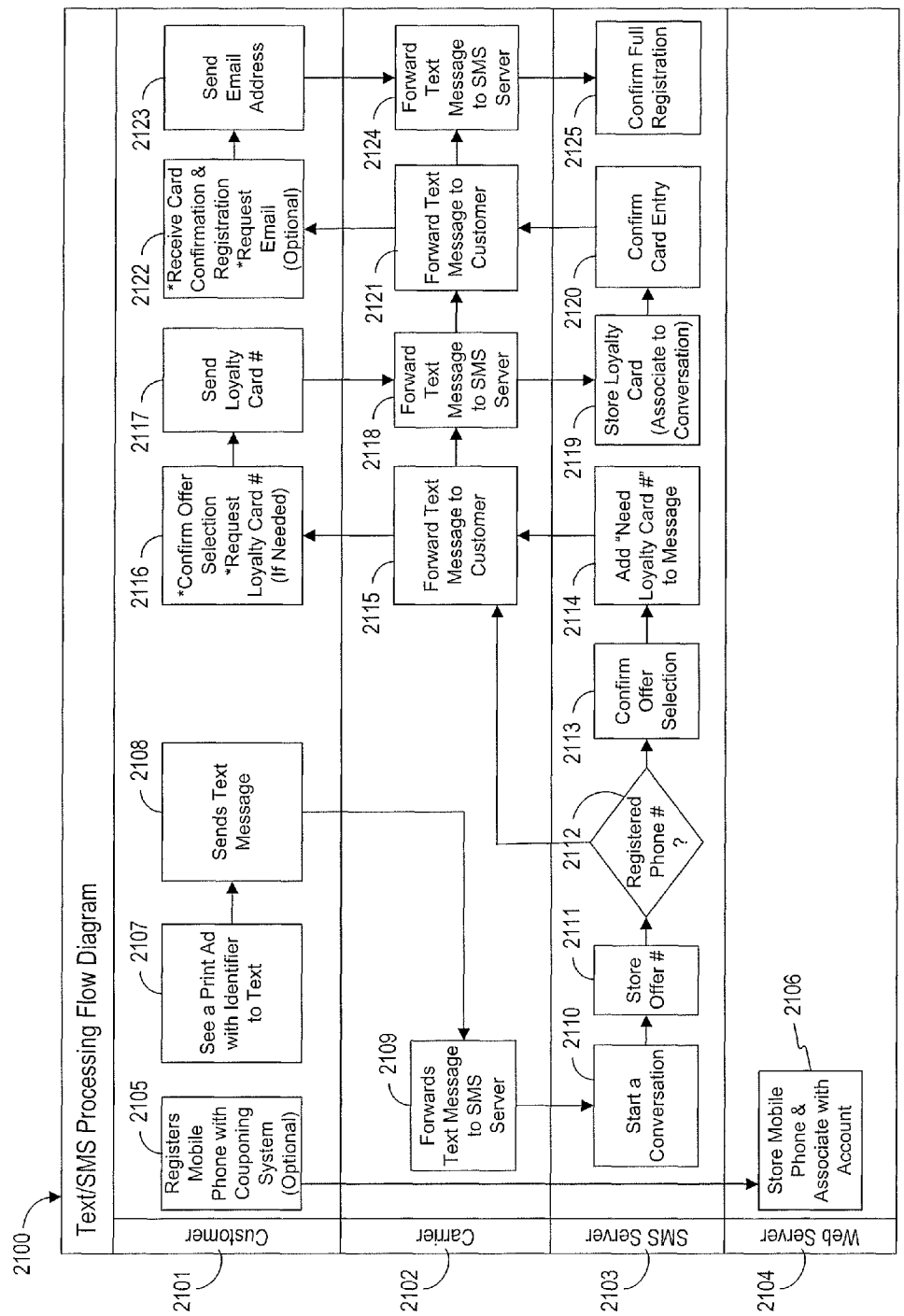
FIG. 21 is a flow diagram illustrating a process of using text messaging to interact with an electronic coupon management system.

FIG 21 is a flow diagram 2100 illustrating a process of using text messaging to interact with an electronic coupon management system. The process may be performed by a customer 2101, a carrier 2102, a short message service (SMS) server 2103, and a web server 2104. The customer 2101 may be a user of a text messaging service and the electronic coupon management system. The carrier 2102 may be an SMS message service provider (e.g., a cellular telephone carrier) or other provider of text messaging (or multimedia messaging) services. The SMS server 2103 may be a server associated with the electronic coupon management system and may be configured to process SMS messages for the electronic coupon management system. The web server 2104 may be a server associated with the electronic coupon management system and may be configured to provide a web interface with which users may manage information included in the electronic coupon management system.

The customer 2101 optionally registers a mobile device (e.g., a cellular telephone) with the electronic coupon management system (2105). For example, the customer 2101 may log in to the electronic coupon management system by entering a user name and password and enter information identifying a mobile phone used by the customer 2101. In one implementation, the customer 2101 may enter a phone number for the customer's mobile phone. The customer 2101 may enter information identifying multiple mobile devices.

In response to the customer 2101 optionally entering information to register a mobile device, the web server 2104 stores information identifying the mobile device and associates the mobile device with the customer's account (2106). For example, the web server 2104 stores the customer's 2101 mobile phone number in electronic storage as part of the customer's 2101 account information. The web server 2104 associates the mobile device with the customer's 2101 account such that text or SMS messages seat from the mobile device are identified as being associated with the customer 2101. The web server 2104 may be configured to associate multiple mobile devices with the customer's 2101 account.

The customer 2101 may observe an advertisement for a coupon with an associated identifier (2107). For example, the customer 2101 may observe an advertisement with a coupon for a discount on a product. The advertisement may be any type of advertisement presented on any type of media. For example, the advertisement may be presented on a publication such as a newspaper, a magazine, a booklet, a book, a newsletter, a brochure, a leaflet, or any other printed material. In other implementations, the advertisement may be presented on a billboard or other type of public display area, broadcast on television or radio, or presented on a web page over the internet. The advertisement includes an identifier in a format that a user can enter in a text or other message and that identifies the associated coupon or other incentive. For example, the identifier may be a string of alphanumeric characters that the customer 2101 can enter into a text message. In one implementation, the identifier is in a format designated by the electronic coupon management system. In this implementation, the electronic coupon management system may use a system specific format for identifiers and may generate and distribute advertisements with coupons that include identifiers in the system specific format and/or have other advertisement distributors place the electronic coupon management system identifier on advertisements that the distributors distribute.

In another implementation, the identifier may be a generic, identifier placed on all advertisements with coupons. For example, the identifier may be a bar code or UPC code that is in a standardized format and that identifies the coupon. In one implementation, the identifier may be in the extended UPC format and the electronic coupon management system may obtain identifiers in the extended UPC format from advertisement distributors and receive advertisement information for advertisements associated with the identifiers in the extended UPC format. In this implementation, the electronic coupon management system may store the information obtained from the advertisement distributors to enable users of the electronic coupon management system to add coupons to the user's loyalty cards, even if the advertisements are not being offered directly by the electronic coupon management system. Implementations may include rate limiting the number of times a particular coupon may be added and/or time limiting the period with which a coupon may be added. For example, the customer 2101 may only be able to add a particular coupon one time and/or may only be able to add a coupon one month after the coupon has been published in print media.

The customer 2101 sends a text message including the identifier to the electronic coupon management system (2108). For example, the customer 2101 enters the identifier observed in the advertisement in a text or other message using a mobile device and sends the text or other message including the identifier to a number associated with the electronic coupon management system. In one implementation, the text message includes only the identifier for the advertisement. In another implementation, the text message includes other information to identify the customer 2101 to the electronic coupon management system. For example, the text message may also include a username and password to identify the customer 2101 and/or a loyalty card number associated with the customer 2101.

The carrier 2102 forwards the text message to the SMS server 2103 (2109). For example, the carrier 2102 receives the text message from a mobile device that the customer 2101 uses to send the text message and routes the text message to the SMS server based on the number associated with the text message. The text message may be transmitted over any type of wireless or wired network.

The SMS server 2103 receives the text message and starts a conversation (2110). For example, the SMS server 2103 receives the text message sent by the customer 2101 and forwarded to the SMS server 2103 by the carrier 2102. Based on receipt of the text message, the SMS server 2103 may initiate a process starting a conversation with the customer 2101 who sent the text message.

The SMS server 2103 stores the offer number associated with the identifier included in the text message (2111). For example, the SMS server 2103 stores the offer number in electronic storage such that the offer number is associated with the phone number of the mobile device originating the text message. The offer number may be the same as the identifier of may be another number used by the electronic coupon management system to identify the offer.

The SMS server 2103 determines whether the phone number of the mobile device originating the text message is registered (2112). For example, the SMS server 2103 compares the phone number to information stored in the electronic coupon management system identifying registered phone numbers. In this example, the information may include information associating phone numbers with user accounts and/or information of phone numbers that have been registered but not associated with a user account (e.g., the phone number may be the only information identifying the user).

If the phone number has been registered, the stored offer number is associated with the user associated with the phone number and added to loyalty cards entered by the user. The SMS server 2103 sends a return text message to the phone number of the mobile device of the customer 2101. The return text message may confirm receipt of the text message and may confirm that the offer associated with the advertisement has been added to the user's account and loyalty cards.

If the phone number has not been registered, the stored offer number may remain associated with the phone number, but more information is required to add the offer to a user's loyalty card. The SMS server 2103 may generate a text message confirming offer selection (2113) and adds information to the text message indicating that the electronic coupon management system needs a loyalty card number (2114). For example, the SMS server 2103 may generate a text message that confirms receipt of a text message including the identifier associated with the advertisement and may add the text "Need Loyalty Card Number" to the text message. The SMS server 2103 sends the generated text message to the phone number of the mobile device of the customer 2101.

The carrier 2102 forwards the text message from the SMS server 2103 (e.g., the return text message if the phone number is registered or the generated text message if the phone number is not registered) to the customer 2101 (2115). For example, the carrier 2102 receives the text message from the SMS server 2103 and routes the text message to the customer 2101 based on the number associated with the text message.

The customer 2101 receives the text message confirming offer selection and optionally requesting a loyalty card number (2116). If the phone number of the customer 2101 is registered, no other information is necessary to associate the offer to the customer's 2101 account and the text message confirms the offer selection. In this case, the text message confirming offer selection completes the process and the customer 2101 may exercise the offer (e.g., use a coupon) by presenting the customer's 2101 loyalty card at a corresponding retail store. If the phone number of the customer 2101 is not registered, more information may be needed from the customer 2101, in which case the process continues.

The customer 2101 sends a text message including a loyalty card number to the electronic coupon management system (2117). For example, the customer 2101 enters a loyalty card number in a text message using a mobile device and sends the text message including the loyalty card number to a number associated with the electronic coupon management system. The text message may include multiple loyalty card numbers or the customer may send multiple text messages with each text message including a loyalty card number of the customer 2101.

The carrier 2102 forwards the text message including the loyalty card number to the SMS server 2103 (2118). The carrier 2102 forwards the text message as described above with respect to step 2109.

The SMS server 2103 receives the text message including the loyalty card number and stores the loyalty card number in association with the conversation (2119). For example. the SMS server 2103 may store the loyalty card number in temporary or permanent storage with information sufficient to associate the loyalty card number with the conversation (e.g., the SMS server 2103 may store the loyalty Card number in temporary storage with the customer's 2101 telephone number). In this example, the loyalty card number may be associated with the user's account or may be associated with a new account created for the user after the loyalty card number has been verified. In another example, the loyalty card number may be stored in association with the user's account or in association a new account created for the user upon receipt of the loyalty card number.

The SMS server 2103 generates and sends a text message confirming card entry (2120) and the carrier 2102 forwards the text message to the customer 2101 (2121). For example, the text message sent and forwarded to the customer 2101 may include a message confirming that the loyalty card number was received by the electronic coupon management system. The text message may also include the loyalty card number received and may indicate that the loyalty card number has been added to the customers 2101 account or a new account created for the customer 2101. Optionally, the text message may include a request for an email address of the customer 2101.

The customer 2101 receives the text message confirming card entry and optionally requesting an email address (2122).

If the text message includes a request for an email address of the customer 2101, the customer 2101 may send a text message including an email address to the electronic coupon management system (2123). For example, the customer 2101 enters an email address in a text message using a mobile device and sends the text message, including the email address to a number associated with the electronic coupon management system.

The carrier 2102 forwards the text message including the email address to the SMS server 2103 (2124). The carrier 2102 forwards the text message as described above with respect to step 2109.

The SMS server 2103 receives the text message including the customer's 2101 email address and confirms full registration (2125). For example, the SMS server 2103 may store the email address in association with the customer's 2101 account and may send the customer an email message confirming that registration has been completed.

Figure 22:
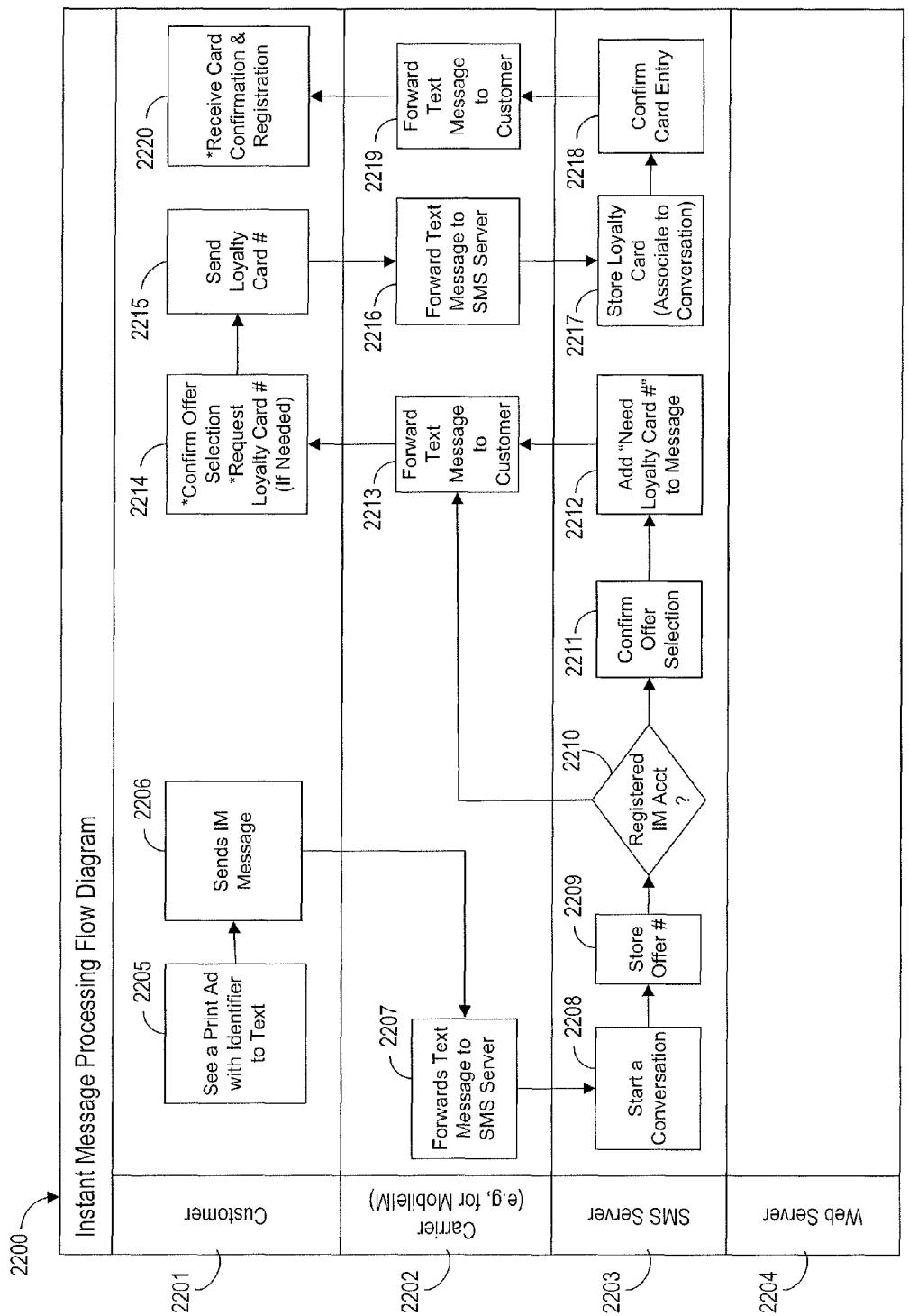
FIG. 22 is a flow diagram illustrating a process of using mobile instant messaging to interact with an electronic coupon management system.

FIG 22 is a flow diagram 2200 illustrating a process of using mobile instant messaging to interact with an electronic coupon management system. The process may be performed by a customer 2201, a carrier 2202, an SMS server 2203, and a web server 2204. The customer 2201, the carrier 2202, the SMS server 2203, and the web server 2204 correspond to the customer 2101, the carrier 2102, the SMS server 2103, and the web server 2104 described with respect to FIG. 21.

Steps 2205-2220 are performed using mobile instant messaging technology in a manner similar to steps 2107-2122 described with respect to FIG. 21 and performed using text or SMS messaging technology. For example, the customer 2201 sends a mobile instant message using a mobile instant messaging application executing on the customer's 2201 mobile phone. The instant message may include an identifier (2206), whereas the customer 2101 sends a text message with an identifier (2108). In another example, the SMS server 2203 determines whether the user sending the mobile instant message has a registered instant messaging account (2210), whereas the SMS server 2103 determines whether the phone number of the mobile device originating the text message is registered (2112).

Implementations may include other communication techniques for providing coupon information to the electronic coupon management system. For example, a customer may use instant messaging technology operating on a personal computer to send a coupon identifier to the electronic coupon management system. In another example, a customer may provide a coupon identifier to the electronic coupon management system using IVR technology.

Although coupons may be associated with and added by manufacturers, in some implementations coupons may be associated with and added by retailers. In this case, the coupon associated with and/or added by the retailer may only be associated with the loyalty card corresponding to the specific retailer and not other retailers. Accordingly, messages regarding addition of retailer coupons and redemption of retailer coupons may only be exchanged with a loyalty server associated with the retailer offering the coupon. As such, the user may be able to redeem the coupon at the specific retailer, but not at other retailers. The coupon may be for specific goods provided by the retailer or for any goods offered by the retailer. The retailer may assume the cost of the value of the coupon. In another implementation, coupons may be associated with an application system. The application system may offer a generic coupon that may be redeemable by one or more retailers and for any goods or a subset of goods. The owner Of the application system may assume the cost of the value of the coupon and the coupon may be offered as an incentive to join the application system or to response to complaint with the application system. In one implementation, the generic coupon may include a product code of all zeroes, such that the coupon may be applied to any good the costumer is purchasing.

Although the coupons are described above as being redeemed using loyalty cards, other implementations may allow coupons to be redeemed using other items. For example, coupons may be redeemed by a customer entering a user account number associated with an application system. In another implementation, coupons may be associated with credit cards and coupons may be automatically redeemed when the customer uses the credit card in a similar manner as when the customer uses a loyalty card discussed above. In another implementation, coupons may be associated with, a mobile device of a user, such as a cell phone, PDA, etc. In one implementation, the mobile device may store information associated with the coupons and may communicate this information to a point of sale retailer system using a wireless protocol such as Bluetooth, when a user is purchasing goods. In another implementation, a point of sale retailer system may identify a user account based on the mobile device of the user detected using a wireless protocol, such as Bluetooth. In another implementation, coupons may be associated with a personal identifying feature such as a customer's fingerprint or retinal scan.

In another implementation, displays throughout a store may be configured to detect coupons associated with a user. For example, if a user has coupons associated with a mobile device, a product display may be available to detect coupons associated with the mobile device through wireless communications via a wireless communication protocol, such as Bluetooth. When a product display detects a mobile device associated with coupons, the product display may send an alert to the mobile device indicating that the display is offering a product for which the customer has a coupon.

Although implementations have been described with respect to consumer packaged goods, implementations may apply to any type of products or services for which electronic coupons may be used. In addition, although implementations have been described where a user redeems coupons while making purchases at a retail store, coupons may be redeemed when a user is making purchases, at an online retailer in a similar manner. The goods may be groceries from a grocery store, or other goods or services available for sale.

Although implementations have been described where a user adds coupons using a web page provided by an application system, users may add coupons in other manners. For example, a user may browse a web page not provided by the application system that includes a coupon. The user may select the coupon and the application system communicates with the other web page and associates the coupon with the user's account. In one implementation, coupons may be provide as banner ads on web pages located throughout the Internet. In another implementation, a user may add paper coupons to the user's account. For example, the user may be able to enter an identification number associated with the paper coupon to add the coupon to the user's account. In another example, the user may scan an electronic copy of the paper coupon and send the scanned coupon to the application system to associate the coupon with the user's account.

Various implementations described above may achieve scalability benefits. For example, in some implementations, all of the coupon data necessary to match a customer's coupons with the goods the customer is purchasing and automatically redeem the matched coupons is downloaded to a point of sale system. Because all of the data necessary to perform automatic coupon redemption is downloaded to a point of sale system, more coupons may be processed more efficiently, in part, due to the fact that less network communications between the point of sale and loyalty server may be needed to process a given coupon.

What is claimed is:

1. A system of handling electronic coupons, the system comprising:
    a processor; and
    a memory,
        wherein the memory stores instructions that, when executed by the processor, cause the system to perform the operations of:
            accessing information indicating association of an electronic coupon with an account of a user, the account including information identifying a first retail entity and a second retail entity, wherein the second retail entity is different than the first retail entity;
            transmitting information indicating association of the electronic coupon with the user's account to a first computer system associated with the first retail entity, wherein receipt of the information indicating association of the electronic coupon by the first computer system causes the first computer system to associate the electronic coupon with the user such that the user may redeem the electronic coupon with the first retail entity upon presentation of a first user identifier;
            transmitting information indicating association of the electronic coupon with the user's account to a second computer system associated with the second retail entity, wherein the second computer system is different from the first computer system and receipt of the information indicating association of the electronic coupon by the second computer system causes the second computer system to associate the electronic coupon with the user such that the user may redeem the electronic coupon with the second retail entity upon presentation of a second user identifier;
            receiving, from the first computer system, information indicating that the user has redeemed the electronic coupon with the first retail entity; and
            in response to receiving, from the first computer system, the information indicating that the user has redeemed the electronic coupon with the first retail entity, transmitting cancellation information for the electronic coupon to the second computer system associated with the second retail entity, wherein receipt of the cancellation information by the second computer system causes the second computer system to cancel the redeemability of the electronic coupon by the user such that the user is prevented from redeeming the electronic coupon with the second retail entity.

2. The system of claim 1, wherein the memory further stores instructions that, when executed by the processor, cause the system to perform the operations of:
    transmitting an identifier of the electronic coupon and information related to terms of the electronic coupon to the first computer system associated with the first retail entity and the second computer system associated with the second retail entity prior to accessing information indicating association of the electronic coupon with the user's account,
    wherein transmitting information indicating association of the electronic coupon with the user's account to the first computer system associated with the first retail entity includes transmitting an identifier of the user to the first computer system and the identifier of the electronic coupon such that the information related to the terms of the electronic coupon at the first computer system is associated with the user, and
    further wherein transmitting information indicating association of the electronic coupon with the user's account to the second computer system associated with the second retail entity includes transmitting an identifier of the user to the second computer system and the identifier of the electronic coupon such that the information related to the terms of the electronic coupon at the second computer system is associated with the user.

3. The system of claim 1, wherein the memory further stores instructions that, when executed by the processor, cause the system to perform the operations of:
    receiving information identifying a third retail entity to associate with the user's account after accessing the information indicating association of the electronic coupon with the user's account and prior to receiving, from the first computer system, information indicating that the user has redeemed the electronic coupon at the retail store associated with the first retail entity, wherein the third retail entity is different than the first retail entity and the second retail entity;

associating the third retail entity with the user's account in response to receiving the information identifying the third retail entity;

transmitting information indicating that the electronic coupon is associated with the user's account to a third computer system associated with the third retail entity, wherein the third computer system is different from the first computer system and the second computer system and receipt of the information indicating that the electronic coupon is associated with the user's account by the third computer system causes the third computer system to associate the electronic coupon with the user such that the user may redeem the electronic coupon with the third retail entity upon presentation of a third user identifier; and in response to receiving, from the first computer system, the information indicating that the user has redeemed the electronic coupon with the first retail entity, transmitting cancellation information for the electronic coupon to the third computer system associated with the third retail entity, wherein receipt of the cancellation information by the third computer system causes the third computer system to cancel the redeemability of the electronic coupon by the user such that the user is prevented from redeeming the electronic coupon with the third retail entity.

4. The system of claim 1, wherein the memory further stores instructions that, when executed by the processor, cause the system to perform the operations of:

accessing information indicating association of a second electronic coupon with the user's account, the second electronic coupon being redeemable with the first retail entity but not redeemable with the second retail entity; and transmitting information indicating association of the second electronic coupon with the user's account to the first computer system associated with the first retail entity but not to the second computer system associated with the second retail entity, wherein receipt of the information indicating association of the second electronic coupon by the first computer system causes the first computer system to associate the second electronic coupon with the user such that the user may redeem the second electronic coupon with the first retail entity upon presentation of the first user identifier.

5. The system of claim 1, wherein the first user identifier and the second user identifier each include at least one of a loyalty card number, a user account number, a credit card number, a name, a biometric identifier, or a wireless identification number provided by a device configured to transmit the wireless identification number.

6. The system of claim 1, wherein:

transmitting information indicating association of the electronic coupon with the user's account to the first computer system associated with the first retail entity includes transmitting information indicating association of the electronic coupon with the user's account to a first loyalty server, the first loyalty server being configured to store information associating the electronic coupon with the user such that the user may redeem the electronic coupon with the first loyalty server by presenting a first loyalty card to a first point-of-sale computer included in the first computer system, transmitting information indicating association of the electronic coupon with the user's account to the second computer system associated with the second retail entity includes transmitting information indicating association of the electronic coupon with the user's account to a second loyalty server, the second loyalty server being configured to store information associating the electronic coupon with the user such that the user may redeem the electronic coupon with the second loyalty server by presenting a second loyalty card to a second point-of-sale computer included in the second computer system, and receiving, from the first computer system, information indicating that the user has redeemed the electronic coupon at a retail store associated with the first retail entity includes receiving, from the first loyalty server, information indicating that the user has redeemed the electronic coupon with the first loyalty server, the first loyalty server being configured to transmit the information indicating that the user has redeemed the electronic coupon in response to receiving information, from the first point-of-sale computer, indicating that the user has redeemed the electronic coupon.

7. The system of claim 1, wherein the memory further stores instructions that, when executed by the processor, cause the system to perform the operations of:

maintaining the account of the user of the electronic coupon system;

receiving a selection of the electronic coupon by the user; and associating the electronic coupon with the user's account.

8. The system of claim 7, wherein the memory further stores instructions that, when executed by the processor, cause the system to perform the operations of:

presenting the electronic coupon over a network to a user computer system such that a display of the user computer system is able to display the electronic coupon in a user interface, wherein receiving the selection of the electronic coupon by the user includes receiving, over the network, a selection of the electronic coupon made by the user interacting with the user interface displaying the electronic coupon.

9. The system of claim 1, wherein transmitting cancellation information for the electronic coupon to the second computer system associated with the second retail entity includes transmitting information indicating redemption of the electronic coupon by the user to the second computer system associated with the second retail entity.

10. The system of claim 1, wherein accessing information indicating association of the electronic coupon with the account of the user of the electronic coupon system includes receiving, over a network, information indicating association of the electronic coupon with the account of the user of the electronic coupon system.

11. A tangible computer-accessible medium having stored thereon executable instructions that, when executed by a processor, cause the processor to perform the following operations:

accessing information indicating association of an electronic coupon with an account of a user, the account including information identifying a first retail entity and a second retail entity, wherein the second retail entity is different than the first retail entity;

transmitting information indicating association of the electronic coupon with the user's account to a first computer system associated with the first retail entity, wherein receipt of the information indicating association of the electronic coupon by the first computer system causes the first computer system to associate the electronic coupon with the user such that the user may redeem the electronic coupon with the first retail entity upon presentation of a first user identifier;

transmitting information indicating association of the electronic coupon with the user's account to a second computer system associated with the second retail entity, wherein the second computer system is different from the first computer system and receipt of the information indicating association of the electronic coupon by the second computer system causes the second computer system to associate the electronic coupon with the user such that the user may redeem the electronic coupon with the second retail entity upon presentation of a second user identifier;

receiving, from the first computer system, information indicating that the user has redeemed the electronic coupon with the first retail entity; and in response to receiving, from the first computer system, the information indicating that the user has redeemed the electronic coupon with the first retail entity, transmitting cancellation information for the electronic coupon to the second computer system associated with the second retail entity, wherein receipt of the cancellation information by the second computer system causes the second computer system to cancel the redeemability of the electronic coupon by the user such that the user is prevented from redeeming the electronic coupon with the second retail entity.

12. The medium of claim 11, wherein the memory further stores instructions that, when executed by the processor, cause the system to perform the operations of:

transmitting an identifier of the electronic coupon and information related to terms of the electronic coupon to the first computer system associated with the first retail entity and the second computer system associated with the second retail entity prior to accessing information indicating association of the electronic coupon with the user's account, wherein transmitting information indicating association of the electronic coupon with the user's account to the first computer system associated with the first retail entity includes transmitting an identifier of the user to the first computer system and the identifier of the electronic coupon such that the information related to the terms of the electronic coupon at the first computer system is associated with the user, and further wherein transmitting information indicating association of the electronic coupon with the user's account to the second computer system associated with the second retail entity includes transmitting an identifier of the user to the second computer system and the identifier of the electronic coupon such that the information related to the terms of the electronic coupon at the second computer system is associated with the user.

13. The medium of claim 11, wherein the memory further stores instructions that, when executed by the processor, cause the system to perform the operations of:

receiving information identifying a third retail entity to associate with the user's account after accessing the information indicating association of the electronic coupon with the user's account and prior to receiving, from the first computer system, information indicating that the user has redeemed the electronic coupon with the first retail entity, wherein the third retail entity is different than the first retail entity and the second retail entity;

associating the third retail entity with the user's account in response to receiving the information identifying the third retail entity;

transmitting information indicating that the electronic coupon is associated with the user's account to a third computer system associated with the third retail entity, wherein the third computer system is different from the first computer system and the second computer system and receipt of the information indicating that the electronic coupon is associated with the user's account by the third computer system causes the third computer system to associate the electronic coupon with the user such that the user may redeem the electronic coupon with the third retail entity upon presentation of a third user identifier; and in response to receiving, from the first computer system, the information indicating that the user has redeemed the electronic coupon with the first retail entity, transmitting cancellation information for the electronic coupon to the third computer system associated with the third retail entity, wherein receipt of the cancellation information by the third computer system causes the third computer system to cancel the redeemability of the electronic coupon by the user such that the user is prevented from redeeming the electronic coupon with the third retail entity.

14. The medium of claim 11, wherein the memory further stores instructions that, when executed by the processor, cause the system to perform the operations of:

accessing information indicating association of a second electronic coupon with the user's account, the second electronic coupon being redeemable with the first retail entity but not redeemable with the second retail entity; and transmitting information indicating association of the second electronic coupon with the user's account to the first computer system associated with the first retail entity but not to the second computer system associated with the second retail entity, wherein receipt of the information indicating association of the second electronic coupon by the first computer system causes the first computer system to associate the second electronic coupon with the user such that the user may redeem the second electronic coupon with the first retail entity upon presentation of the first user identifier.

15. The medium of claim 11, wherein the first user identifier and the second user identifier each include at least one of a loyalty card number, a user account number, a credit card number, a name, a biometric identifier, or a wireless identification number provided by a device configured to transmit the wireless identification number.

16. The medium of claim 11, wherein:

transmitting information indicating association of the electronic coupon with the user's account to the first computer system associated with the first retail entity includes transmitting information indicating association of the electronic coupon with the user's account to a first loyalty server, the first loyalty server being configured to store information associating the electronic coupon with the user such that the user may redeem the electronic coupon with the first loyalty server by presenting a first loyalty card to a first point-of-sale computer included in the first computer system, transmitting information indicating association of the electronic coupon with the user's account to the second computer system associated with the second retail entity includes transmitting information indicating association of the electronic coupon with the user's account to a second loyalty server, the second loyalty server being configured to store information associating the electronic coupon with the user such that the user may redeem the electronic coupon with the second loyalty server by presenting a second loyalty card to a second point-of-sale computer included in the second computer system, and receiving, from the first computer system, information indicating that the user has redeemed the electronic coupon with the first retail entity includes receiving, from the first loyalty server, information indicating that the user has redeemed the electronic coupon with the first loyalty server, the first loyalty server being configured to transmit the information indicating that the user has redeemed the electronic coupon in response to receiving information, from the first point-of-sale computer, indicating that the user has redeemed the electronic coupon.

17. The medium of claim 11, wherein the memory further stores instructions that, when executed by the processor, cause the system to perform the operations of:

maintaining the account of the user of the electronic coupon system;

receiving a selection of the electronic coupon by the user; and associating the electronic coupon with the user's account.

18. The medium of claim 17, wherein the memory further stores instructions that, when executed by the processor, cause the system to perform the operations of:

presenting the electronic coupon over a network to a user computer system such that a display of the user computer system is able to display the electronic coupon in a user interface, wherein receiving the selection of the electronic coupon by the user includes receiving, over the network, a selection of the electronic coupon made by the user interacting with the user interface displaying the electronic coupon.

19. The medium of claim 11, wherein transmitting cancellation information for the electronic coupon to the second computer system associated with the second retail entity includes transmitting information indicating redemption of the electronic coupon by the user to the second computer system associated with the second retail entity.

20. The medium of claim 11, wherein accessing information indicating association of the electronic coupon with the account of the user of the electronic coupon system includes receiving, over a network, information indicating association of the electronic coupon with the account of the user of the electronic coupon system.

* * * * *